US006327788B1

United States Patent
Seddon et al.

(10) Patent No.: US 6,327,788 B1
(45) Date of Patent: Dec. 11, 2001

(54) SURFACE FORM MEASUREMENT

(75) Inventors: Peter Seddon, Leicester; Michael Mills, Leicestershire; Paul James Scott, Leicester; Roy George White, Leicester; Derek Roger Whittle, Leicester, all of (GB)

(73) Assignee: Taylor Hobson Limited (GB)

( * ) Notice: Subject to any disclaimer, the term of this patent is extended or adjusted under 35 U.S.C. 154(b) by 0 days.

(21) Appl. No.: 09/091,035

(22) PCT Filed: Dec. 6, 1996

(86) PCT No.: PCT/GB96/03003
   § 371 Date: Jan. 20, 1999
   § 102(e) Date: Jan. 20, 1999

(87) PCT Pub. No.: WO97/21076
   PCT Pub. Date: Jun. 12, 1997

(30) Foreign Application Priority Data

Dec. 7, 1995 (GB) .................................................. 9525080
Jun. 13, 1996 (GB) .................................................. 9612383

(51) Int. Cl.[7] ................................ G01B 3/14; G01B 5/20
(52) U.S. Cl. .................................. 33/551; 33/543; 33/550
(58) Field of Search ............................ 33/542, 543, 545, 33/549, 550, 551, 552, 553, 554

(56) References Cited

U.S. PATENT DOCUMENTS

| 3,866,829 | | 2/1975 | Egawa et al. ..................... 235/151.3 |
| 4,080,741 | * | 3/1978 | Siddall et al. ......................... 33/551 |
| 4,084,324 | | 4/1978 | Whitehouse ....................... 33/174 L |
| 4,903,413 | * | 2/1990 | Bellwood ............................... 33/551 |
| 5,309,646 | | 5/1994 | Randolph, Jr. et al. ............... 33/502 |
| 5,572,798 | * | 11/1996 | Barnaby ................................ 33/549 |
| 5,694,339 | * | 12/1997 | Ishitoya et al. ....................... 33/504 |
| 5,926,781 | * | 7/1999 | Scott ..................................... 33/554 |
| 6,065,220 | * | 5/2000 | Ohtsuka et al. ...................... 33/549 |

FOREIGN PATENT DOCUMENTS

| 0 157 176 | 10/1985 | (EP) . |
| 0 240 150 A2 | 10/1987 | (EP) . |
| 0 240 151 | 8/1990 | (EP) . |

(List continued on next page.)

OTHER PUBLICATIONS

Werkstattstechnik, Zeitschrift fur Industrielle Fertigung, vol. 69, No. 10, Oct. 1979, Berlin DE, pp. 647–650, XP002029083, K. Herzog: "Einfluss der Mess– und Tastsysteme auf die Messunsicherheit von Mehrkoordinaten–Messgeraten" (with English translation).
Machines and Tooling (Stanki I Instrumenty), vol. 48, No. 5, 1977, Melton Mowbray GB, pp. 22–23, XP002029084, V.A. Truten et al: "Instrument for measuring component out–of–roundness and table rotation axis position.".
Microtechnic, No. 2, Jan. 1, 1994, pp. 10–13, XP000458577, Dutschke W. et al.: "Zylinderformpruefung auf Formpruefgeraeten.".

(List continued on next page.)

*Primary Examiner*—Randy W. Gibson
(74) *Attorney, Agent, or Firm*—Lerner, David, Littenberg, Krumholz & Mentlik, LLP

(57) ABSTRACT

A nominally cylindrical surface of a workpiece is sensed by a stylus displaceable radially of an axis of rotation of the surface relative to a support column defining a reference datum so that the stylus follows the cylindrical surface at a given height along the surface. Relative rotation of the workpiece and the stylus about the axis of rotation of the surface is effected and the displacement of the stylus used to determine information relating to the radial form of the surface at that height. These measurements are represented at different heights along the surface so as to determine its cylindrical form. The displacement of the stylus from a given position on the surface at each height before and after rotation of the stylus and workpiece through 180° are measured and the resulting measurements used to compensate for any error or deviation in the reference datum.

54 Claims, 12 Drawing Sheets

FOREIGN PATENT DOCUMENTS

| | | |
|---|---|---|
| 1068062 | 5/1967 | (GB). |
| 1137238 | 12/1968 | (GB). |
| 1 308 553 | 2/1973 | (GB). |
| 1 387 904 | 3/1975 | (GB). |
| 1 477 508 | 6/1977 | (GB). |
| 2 160 975 A | 1/1986 | (GB). |
| 2 197 478 A | 5/1988 | (GB). |
| 2 241 338 A | 8/1991 | (GB). |
| 2 263 338 A | 7/1993 | (GB). |
| 88/08511 | 11/1988 | (WO). |
| 91/09270 | 6/1991 | (WO). |
| 96/12162 | 4/1996 | (WO). |

OTHER PUBLICATIONS

J.F.W. Galyer and C.R. Shotbolt, Metrology for Engineers, Fifth Edition, pp. 256–259, No date.

D.J. Whitehouse, "Some theoretical aspects of error separation techniques in surface metrology," Journal of Physics E: Scientific Instruments, 1976, vol. 9, Great Britain, pp. 531–536.

* cited by examiner

FIG. 13a
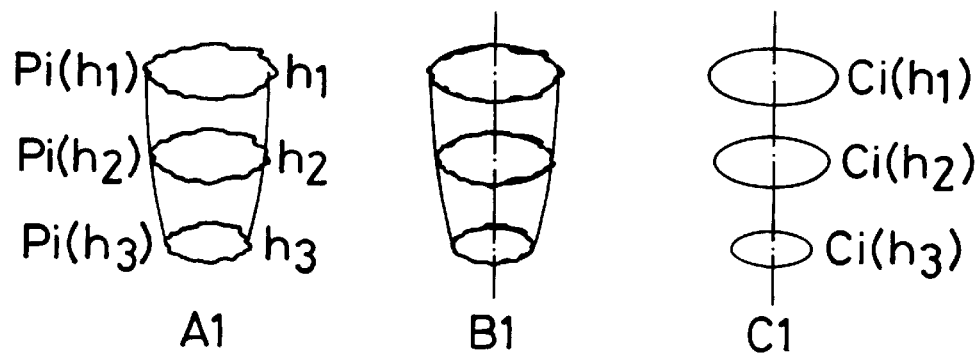
FIG. 13b
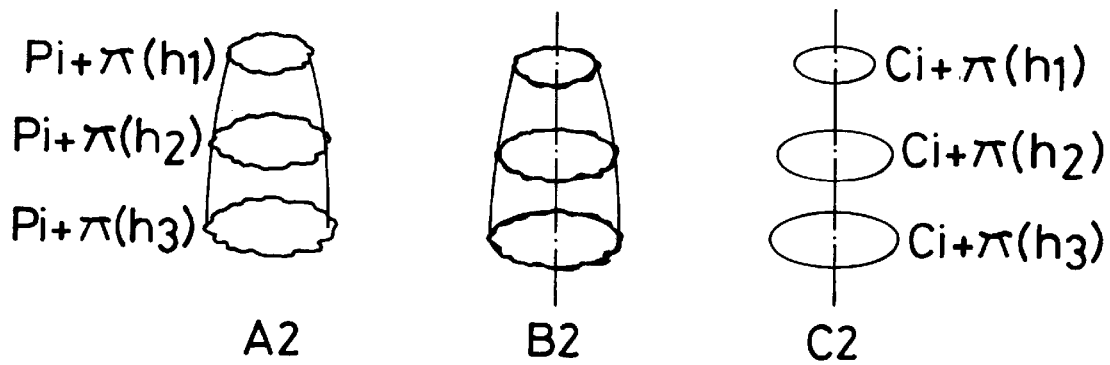
FIG. 13c

SURFACE FORM MEASUREMENT

This invention relates to a method of surface form measurement and is particularly applicable to the measurement of the radial or cylindrical form of an object such as a workpiece. Radial form is related to the roundness of an object and gives an indication of its deviation from circularity. Cylindrical form provides a measure of how close in shape the surface is to a right cylinder.

In known apparatus for measuring cylindrical form such as the applicants' Talyrond TR 200 (trade mark) measurement apparatus, a generally cylindrical workpiece to be measured is mounted on a rotatable support or turntable. The rotatable support is centred and levelled, for example in the manner described in the applicants' EP-A-0240150 the contents of which are incorporated herein by reference, so that the cylindrical axis of the workpiece is coincident with the spindle of the turntable which defines a rotational axis datum. An axial straight datum is defined by a support column located offset from but parallel to the rotational axis datum. The support column carries a probe arm which is moveable along and transversely of the support column to allow a stylus carried by the probe arm to contact the surface of the workpiece.

The radial or cylindrical form of the workpiece is measured by rotating the turntable and measuring the displacement of the stylus relative to the axial straight datum. As the axis of the cylinder is aligned with the rotational axis datum, the displacement of the stylus relative to the axial straight datum provides a measurement of the radius at each angular measurement position during rotation of the rotatable support. The radial form or deviation of the cross-section of the workpiece from a circular cross-section can thus be determined. In addition, the cylindrical form of the workpiece may be determined by making measurements at different heights along the workpiece by moving the probe arm along the axial straight datum. Movement of the probe arm transversely and longitudinally of the axial straight datum is measured by appropriate gauges, for example optical or linear variable differential transducer (LVDT) gauges.

The accuracy of measurements made using such apparatus depends on the accuracy of the rotational axis datum and, especially for cylindrical form, the axial straight datum. It is possible to define the spindle or rotational axis datum to, typically, within ±25 nm (nanometers) so, generally, the mechanical performance of the axial straight datum is the limiting source of error for radial and cylindrical form. Mechanically related errors in the axial straight datum may arise from, for example, long term mechanical instability, for example changes with temperature or other environmental factors, inaccuracies in the actual straightness of the axial straight datum or its parallelism to the rotational axis datum and variability of the interface between the support column defining the axial straight datum and the carriage carrying the probe arm on the support column.

As described in the manual for the Talyrond TR 200 at section 16.8, the straightness of the traverse, that is effectively the straightness of the axial straight datum, may be checked by mounting a cylinder slightly offset from the rotational axis datum of the turntable normally of the axial straight datum. The stylus is then caused to move axially along the surface of the workpiece by moving the probe arm longitudinally of the support column and the variation in the displacement of the stylus from the axial straight datum with height is plotted to form a first straightness graph. The above-mentioned procedure is then repeated after the turntable has been rotated through 180° to form a second straightness graph. The line bisecting the first and second straightness graphs should be a straight line and any departure from straightness of the bisector represents an error in the straightness of the column support or axial straight datum. The slope of the bisector is a function of any residual relative tilt of the column support and the cylindrical workpiece and is not related to the straightness of the column support.

The above-described straightness check is intended to be carried out from time to time before making a measurement on a workpiece so as to ensure that the straightness of the axial straight datum lies within acceptable limits and to enable calibration of the apparatus.

An embodiment of the present invention provides a method of measuring the form of a surface which is nominally symmetric about an axis, for example a surface having a cylindrical form, which method enables the effects of any deviations in the measurement direction in a reference datum to be eliminated or at least reduced during the measurement process.

In an embodiment, sensing means are used to obtain at least two sets of data for measurement points $P_i(h_y)$ on a surface with the points $P_i(h_y)$ being at different angular positions (with respect to an axis about which relative rotation of the surface and the sensing means is effected) for each measurement and the at least two sets of data are combined to compensate for any deviations in, for example, straightness or parallelism in a datum to which the measurements made by the sensing means are referenced. For example, the two sets of data may be combined by taking the mean of two values measured for the same location on the surface measured with two different orientations of the sensing means to the reference datum to give an indication of the radius (that is the distance from the said axis to the location) at that location. The difference of the same two measurements may be taken to give an indication of the value of any deviation or error in the reference datum. This enables measurements of the form at a given height along a surface to be made which are not dependent on errors in the reference datum in the measurement direction. By making such measurements at different heights along the surface of the object, the form of the object can be determined without being affected by any deviation or error in the reference datum in the measurement direction.

In an embodiment, two sensing means are used to obtain data for two diametrically opposed points $P_i(h_y)$ and $P_{i+\pi}(h_y)$ on a surface so allowing two sets of data to be obtained at the same time. In this example a diameter determined by the separation of the two sensing means may be compared with a diameter obtained by combining the polar data which is obtained individually from the two sensing means and which is referenced to a reference datum. This enables any deviation in the measurement direction in the reference datum to be determined. These measurements may be repeated for other points at the same height and for corresponding points at different heights to determine the overall form of the surface compensated for any deviation in the measurement direction of the reference datum.

In another embodiment, the sensing means comprises a single sensing element biassable in at least two different directions and means for adjusting the biasing of the sensing element to change the direction in which the sensing element is biased.

Relative rotation of the surface and the sensing means may be effected by mounting the surface on a rotatable support. As another possibility, relative rotation of the surface and the sensing means may be effected by rotatably mounting the sensing means to a support and rotating the sensing means about the surface.

In another aspect, the present invention provides apparatus for determining the shape, form, texture or roughness of a surface using a sensing means having adjustable biassing means to enable the sensing means to be biased in different directions.

Embodiments of the present invention will now be described, by way of example, with reference to the accompanying drawings in which:

FIG. 4b is a diagrammatic side view of the apparatus shown in FIG. 4a;

FIG. 6b is a top plan view of part of the apparatus shown in FIG. 6a;

Figure 14:
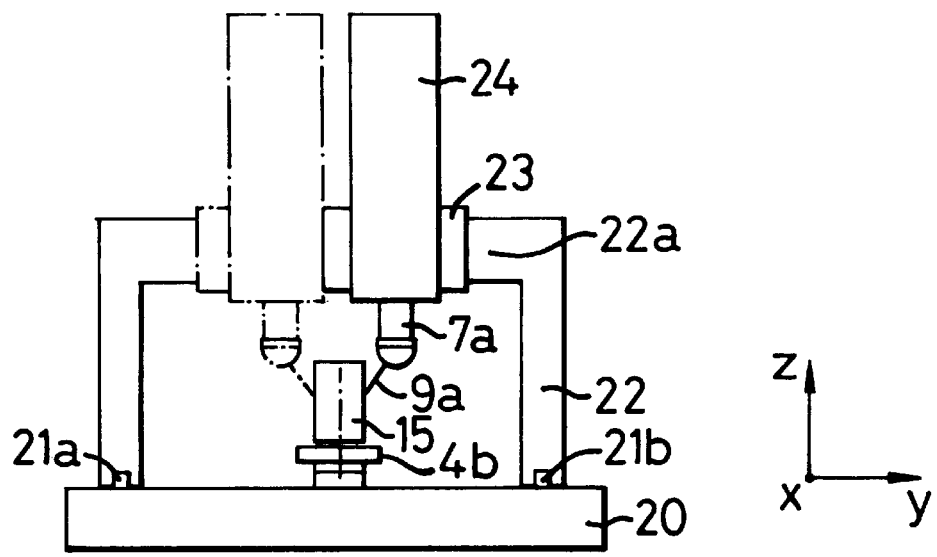
Figure 15:
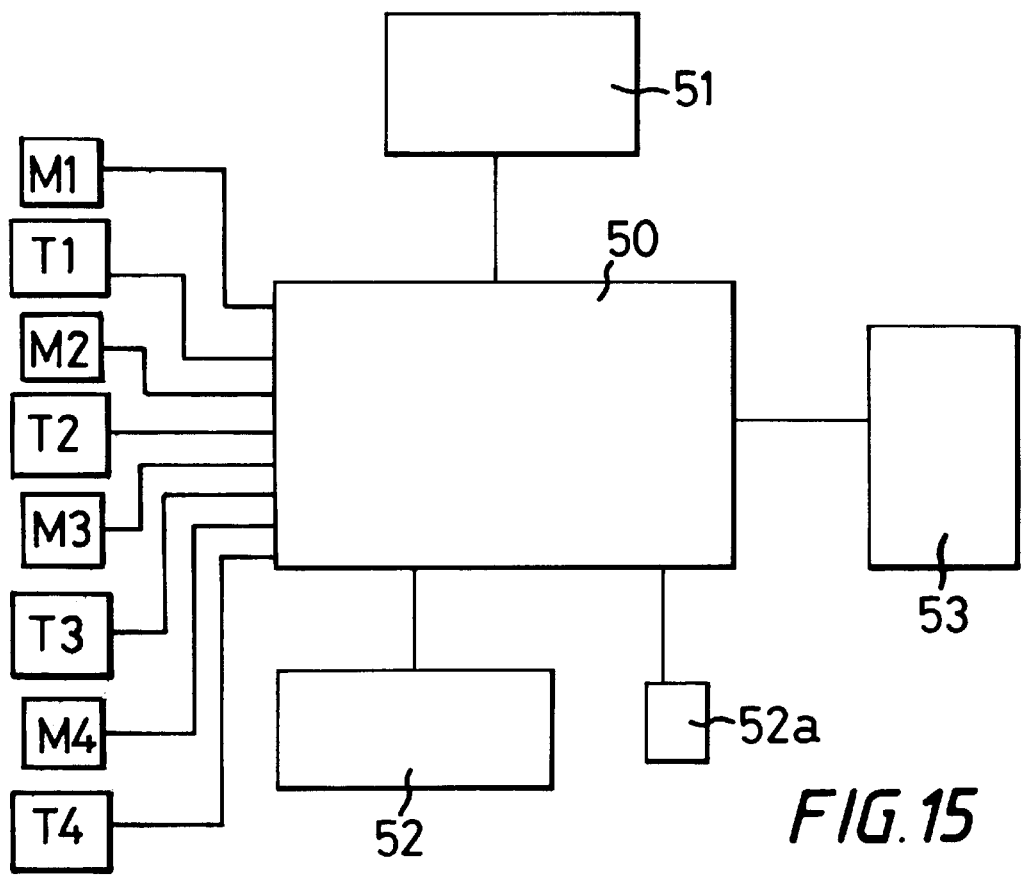

FIGS. 13a, b and c are diagrammatic views for illustrating a variation of a method in accordance with the present invention;

FIG. 14 shows a diagrammatic side view of a modified coordinate measuring machine suitable for use in a method in accordance with the present invention; and FIG. 15 is a simplified block diagram of a control system for the apparatus shown in the preceding Figures.

Figure 1:
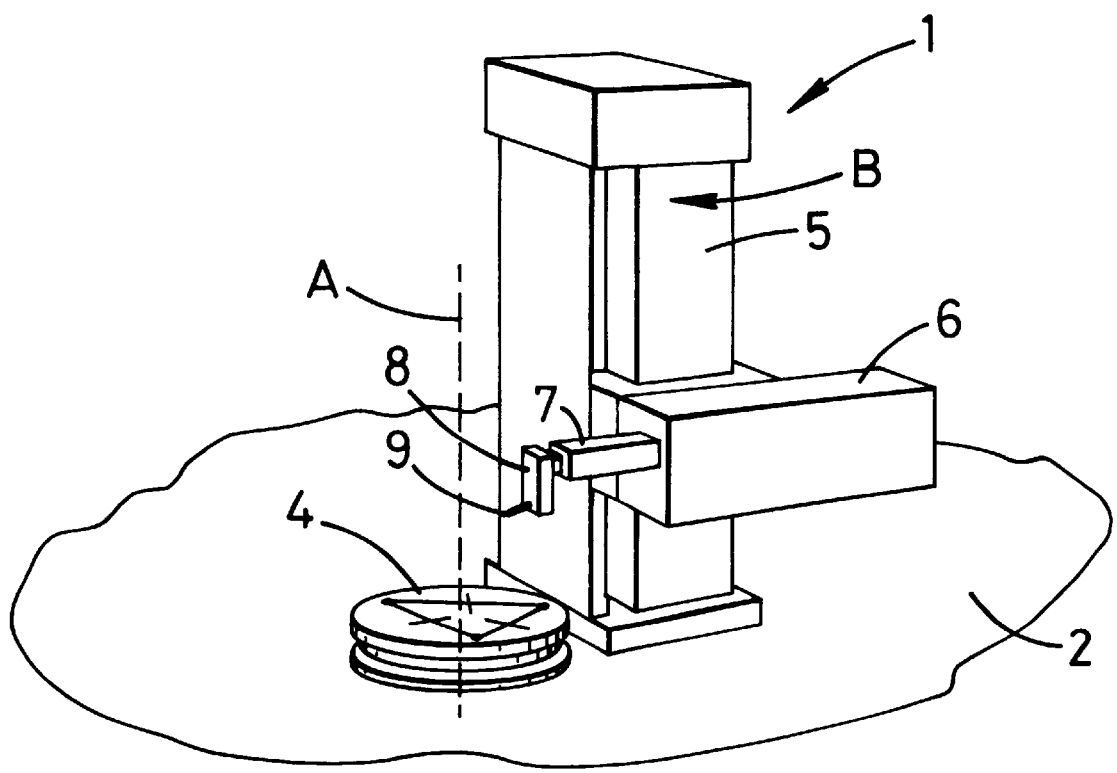
FIG. 1 is a simplified schematic perspective view one example of metrological apparatus suitable for use in a method in accordance with the invention.

Referring now to FIG. 1, a first example of a metrological apparatus 1 suitable for use in a method in accordance with the invention comprises a work bench 2 (only part of which is shown) which carries a rotatable support or turntable 4 for receiving a workpiece (not shown) to be measured. The turntable 4 has a rotational axis shown by the dashed line A in FIG. 1. A support column 5 extends perpendicularly of the work bench 2 and has a longitudinal axis shown by the dashed line B. The rotational axis A of the turntable 4 defines a rotational axis datum while the support column 5 defines an axial straight datum in the form of a plane passing through the axis B parallel to the rotational axis datum A.

A carriage 6 is moveable along the support column 5 parallel to the axial straight datum B by means, for example, of a motor (not shown) or manually. The manner in which the carriage 6 is moved along the support column 5 is conventional and will not be described further. Measurement of the actual location of the carriage 6 along the support column 5 is effected by a suitable conventional linear transducer, for example an optical transducer arrangement such as that described in U.S. Pat. No. 4,807,152, the contents of which are incorporated herein by reference.

A probe arm 7 is mounted to the carriage 6 so as to be moveable transversely of the axial straight datum B and radially of the rotational axis datum A. Again, any suitable form of conventional mechanism such as a lead screw may be used for moving the probe arm 7 relative to the carriage 6. A stylus 9 is mounted to the probe arm 7 by means of a pivotable arm 8. Measurement of the position of the probe arm 7 (and thus the stylus 9) is made using a suitable conventional transducer (not shown).

Figure 2A:
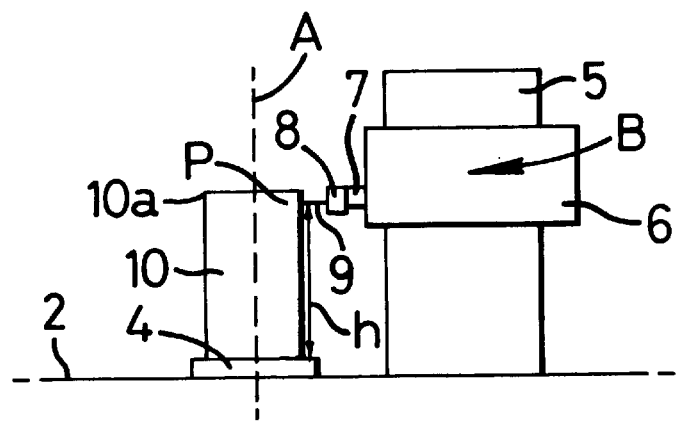
FIGS. 2a and 2b are diagrammatic side and plan views, respectively, of part of the apparatus shown in FIG. 1 for illustrating a first step in a first embodiment of a method in accordance with the invention.

In use of the apparatus, as shown diagrammatically in FIG. 2a, a workpiece 10 of a generally cylindrical external form 10a is mounted to the turntable 4 so that its axis of rotation is coincident with the rotational axis datum A. This may be achieved by, for example, using the centring and levelling arrangement disclosed in EP-A-0240150 or International Patent Application Publication No. WO96/12162, or any other suitable known centring and levelling technique.

The carriage 6 is adjusted to a desired measurement starting height, for example a height h above the base of generally cylindrical workpiece 10. The moveable probe arm 7 is then driven transversely of the carriage 6 until the stylus 9 contacts the surface 10a of the workpiece. Contact between the stylus 9 and the surface 10a of the workpiece may be determined by any suitable mechanism, for example that described in EP-A-0240151 so that the probe arm 7 is driven so as to maintain the deflection of the stylus 9 within the range of operation of an associated transducer. The pivot arm 8 is maintained at a fixed orientation. The distance between the rotational axis datum A and the axial straight datum B minus the displacement of the stylus 9 relative to the axial straight datum B provides a measure R of the radius of the workpiece 10 at the measurement point P at the height h on the workpiece.

As the workpiece 10 is rotated about the rotational datum axis A, a set of radius values $P_i$ ($h_1$) is obtained for each angular orientation, i, of the workpiece at a height h.

Measurements at a different height $h_2$ along the workpiece can be made by driving the carriage 6 along the column 5 and then proceeding to measure a further set of radius values $P_i$ ($h_2$).

After sufficient sets of data at different desired heights $h_y$ have been obtained, the probe can be driven using the extending arm 7 and the pivotal arm 8 so as to address a second measurement position p' diametrically opposed to the original position P.

If necessary the carriage 6 may be lifted in order to avoid interference between the workpiece and the stylus 9.

The stylus 9 can then be driven to the height $h_1$ once more and another set of radius values obtained $P^1_{(i+\pi)}(h_1)$. The carriage 6 can then be driven to all the previous height $h_y$ to obtain corresponding sets of radius data $P_{i+\pi}$ ($h_y$) for each height.

The obtained radial or polar data thus gives two measurements of the radius at each point $P_t(h_y)$ on the surface 10a of the workpiece 10, with the workpiece having been rotated through 180° between the two measurements. By taking the mean of the two measurements at each point $P_t(h_y)$, errors in the axial straight datum B can be compensated for. As indicated above, these errors may arise from mechanical inaccuracies in the straightness of the support column 5 defining the axial straight datum, changes with time in the support column 5 and, for example, variations in the interface between the carriage 6 and the support column 5. Typically, such deviations may be of the same order as deviations from roundness or circularity of the cross-section of a nominally circular cross-section workpiece.

Figure 3A:
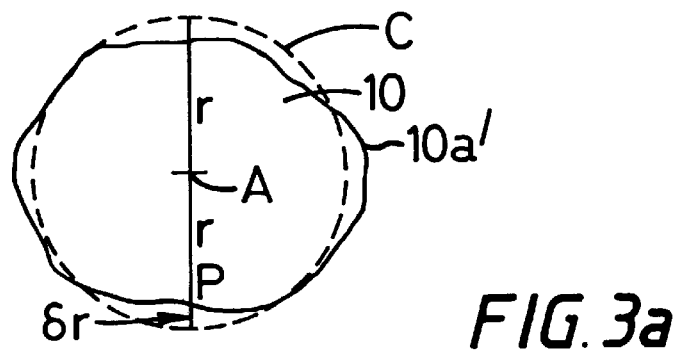
FIGS. 3a to 3d are diagrams for explaining a method embodying the invention.

FIG. 3a shows a cross-section 10a' of the workpiece 10 at a measurement height h. The dashed line circle C represents the circle having the radius r which is the closest fit to the cross-sectional shape or form of the workpiece 10. δr represents the "out of roundness" or deviation from circularity of the cross-section of the workpiece 10 at the measurement point P at the height h.

As indicated above, the axial straight datum B may deviate from straightness for various reasons. The deviation of the axial straight datum B from the ideal $B_1$ is shown as δc in FIG. 3a.

Consider the measurement of a radius at a particular point on the surface at orientation θ of the full data set $P_t(h)$. The radius at this point measured closest to the axial straight datum B (that is the position shown in FIGS. 2a and 2b) is given by:

$$P\theta(h) = r - \delta r + \delta c \qquad 1)$$

The radius $P_j(h)$ is thus dependent on any error δc in the measurement direction in the straightness of the axial straight datum B.

Figure 2B:
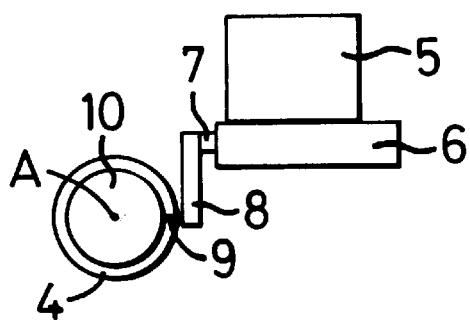
Figure 2C:
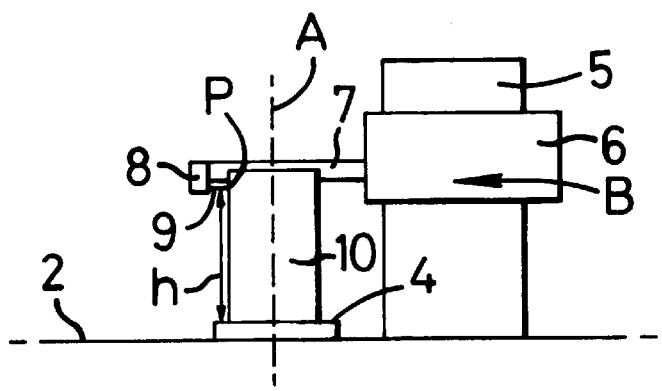
FIGS. 2c and 2d are views similar to FIGS. 2a and 2b for illustrating a second step in a first embodiment of a method in accordance with the present invention.
Figure 2D:
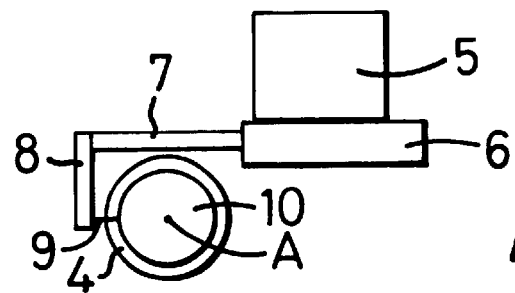

The same radius measured at the same point on the surface (orientation θ) of the workpiece when the gauge is in the second position P' shown in FIGS. 2c and 2d is:

$$P\theta'(h) = r - \delta r - \delta c \qquad 2)$$

Taking the mean of equations 1) and 2) gives:

$$\tfrac{1}{2}(P\theta(h) + P\theta'(h)) = r - \delta r \qquad 3)$$

which is the true radius of the component at orientation θ independent of any error δc in the direction of the measurement in the axial straight datum B.

Thus taking the mean of the two radius measurements Pθ(h) and Pθ'(h) for all values of θ around the circumference of the workpiece at height h will give a complete picture of the cross section and shape (and thus of the radial form of workpieces 10) at the height h, independent of any error in the measurement direction of the axial straight datum B.

The method described above also prevents any lack of straightness in the axial straight datum affecting the measurement of cylindrical form. To explain this, reference will now be made to FIGS. 3b to 3d which are schematic diagrams showing the use of a method embodying the present invention to measure the cylindrical form of a perfect cylinder 100 when the axial straight datum B is bowed so as to be concave when viewed from the workpiece 100. It will, of course, be appreciated that the degree of lack of straightness of the axial straight datum B has been considerably exaggerated in FIGS. 3b and 3c.

Figure 3B:
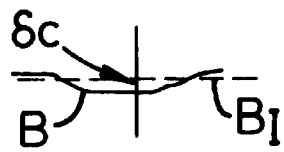
Figure 3B:
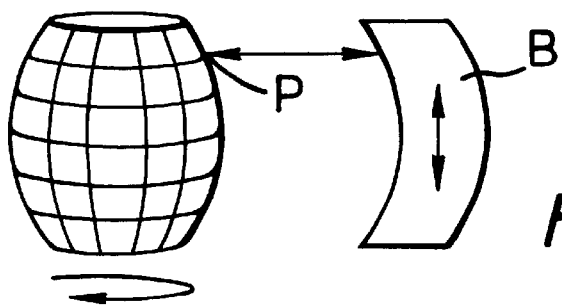

As shown in FIG. 3b, when measurements of the radius of points P around the circumference of the workpiece 100 are made at different heights h along the workpiece 100 with the stylus 9 in the position shown in FIGS. 2a and 2b, the resulting cylindrical form data set represents the workpiece 100 as being barrel-shaped because of the curvature of the axial straight datum B. In contrast, when measurements of the cylindrical form are made with the stylus 9 displaced by 180° from the position shown in FIG. 3b then, as shown in FIG. 3c, the cylindrical form data represents the workpiece 100 as having an inwardly-bowed surface.

Figure 3C:
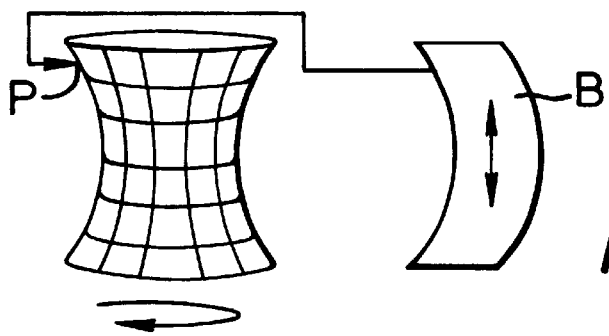
Figure 3D:
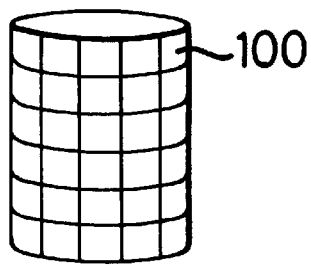

By combining a measurement made of the radius at a point $P_t(h_y)$ using the arrangement shown in FIG. 3b with a measurement of the same point $P_t(h_y)$ with the arrangement shown in FIG. 3c, a set of cylindrical form data is obtained from which the influence of the lack of straightness of the axial straight datum B has been removed so that the workpiece 100 is correctly represented as a perfect cylinder as shown in FIG. 3d.

Thus, the cylindrical form of a workpiece can be determined independently of any errors in the measurement direction in the axial straight datum, so avoiding or at least reducing the need to effect calibration to determine the straightness and/or parallelism of the axial straight datum B before carrying out a measurement.

Although FIGS. 2a to 3d show the measurement of the cylindrical form of an external surface of a workpiece, it will, of course, be appreciated that the above-described method can be applied to measurement of the cylindrical form of an accessible interior surface of a workpiece with, as will be appreciated by those skilled in the art, appropriate modification of the probe arm and stylus.

Figure 4A:
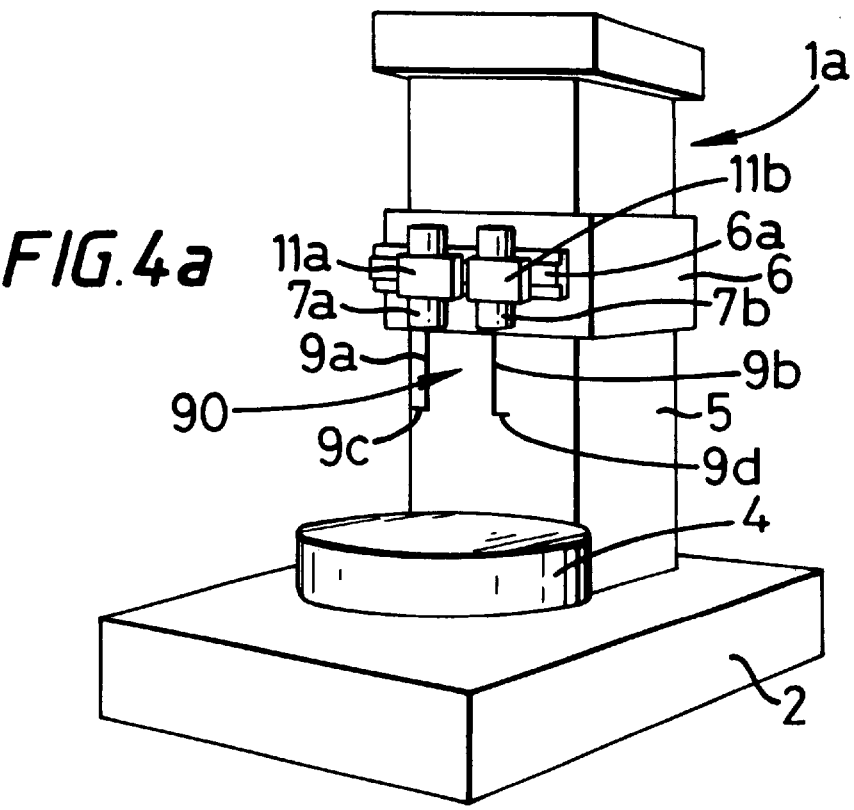
FIG. 4a is a schematic perspective view of one example of apparatus suitable for use in a second embodiment of a method in accordance with the present invention.
Figure 4B:
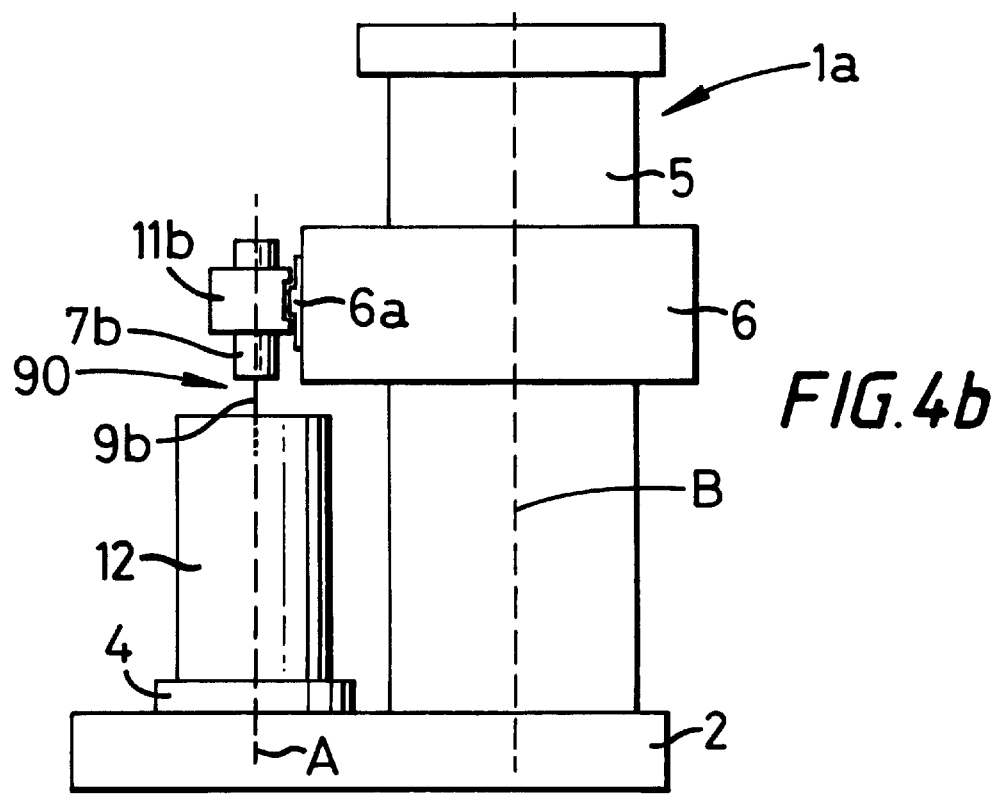

FIG. 4a shows a schematic perspective view of apparatus 1a suitable for use in a second embodiment of a method in accordance with the invention. FIG. 4b is a schematic side view of the apparatus 1a showing a workpiece 12 mounted on the turntable 4.

The apparatus shown in FIG. 4a differs from that shown in FIG. 1 mainly in that the carriage 6 carries two probe arms 7a and 7b each of which carries a respective stylus 9a and 9b to form a twin gauge 90. The probe arms 7a and 7b are received in respective mounting members 11a and 11b which engage a guide rail 6a of the carriage 6 so as to be moveable along the guide rail 6a. Any suitable drive arrangement may be provided for driving the mounting members 11a,11b along the guide rail 6a, for example, a rack and pinion type arrangement may be provided. The mounting members 11a and 11b may be arranged to be driven manually or by a motor (not shown) so that rotation of the motor in one direction causes the carriages 10a and 10b to move in opposite directions. Of course, the mounting members 11a and 11b may be independently driven to provide greater flexibility.

As shown more clearly in the side view of FIG. 4b, the carriage 6 and mounting members 11a and 11b are arranged such that the styli 9a and 9b lie along a diameter of the turntable 4, in the example shown along a diameter perpendicular to a line between the rotational axis datum A and the axial straight datum B defined by the support column 5.

The probe arms 7a and 7b may be mounted so as to be longitudinally moveable by any suitable drive means within the mounting members 11a and 11b to effect minor adjustments in the position of the styli 9a and 9b in a direction parallel to the rotational axis datum A.

The styli 9a and 9b shown in FIG. 4a are elongate members extending parallel to the rotational axis datum. Each stylus 9a, 9b has a tip portion 9c, 9d projecting outwardly (that is away from the other tip portion) at, for example, a right angle to the stylus. The styli 9a and 9b shown in FIGS. 4a and 4b are thus suited for measuring the cylindrical form of an internal surface of a hollow body or workpiece 12 as indicated diagrammatically in FIG. 4b.

The provision of twin styli means that the measurements of each point $P_i(h_y)$ and of each point $P'_i(h_y)$ diametrically opposite to $P_i(h_y)$ can be made without having to re-position the probe or stylus. This means that any errors due to re-positioning of the stylus in the arrangement described above with reference to FIGS. 2 and 3 can be avoided. Also, the use of a pair of styli enables two sets of data to be obtained at the same time, one for the point $P_i(h_y)$ and the other for the point $P_{i+\pi}(h_y)$ 180° displaced around the circumference of the workpiece from the point $P_i(h_y)$. This reduces the amount of time required to obtain a full set of data for the cylindrical form so that temporal and thermal changes should be less significant.

In use of the apparatus shown in FIGS. 4a and 4b, the hollow workpiece 12 is centered and levelled on the turntable 4 in the manner described above so that its nominal axis is coincident with the rotational axis datum A. The carriage 6 is then operated to cause the styli 9a and 9b to move into the hollow workpiece 12 until they reach a desired measurement height h. The mounting members 11a and 11b are then driven so as to move the styli 9a and 9b apart until the styli contact respective diametrically opposed points $P_i(h_y)$ and $P_{i+\pi}(h_y)$ on the internal surface of the workpiece 12.

The position of each stylus 9a and 9b is determined using any suitable conventional measurement transducer, (for example an optical or electromagnetic transducer arrangement) associated with the drive mechanisms of the mounting members 11a and 11b. The measurement obtained from one of the styli 9a and 9b thus provides an indication of the radius at point $P_i(h_y)$ while the measurement of the position of the other one of the styli 9a and 9b provides an indication of the radius at the point $P_{i+\pi}(h_y)$. The separation of the styli 9a and 9b may also be determined to give a measurement of the diameter $d_c$ between the points $P_i(h_y)$ and $P_{i+\pi}(h_y)$. This diameter $d_c$ is independent of the rotational axis datum A and the axial straight datum B and thus does not involve any errors resulting from inaccuracies in the axial straight datum B along the diameter $d_c$.

It will, of course, be appreciated that measurements of the radial polar data can $P_i(h_y)$ be obtained using just one of the two styli 9a and 9b. However, as mentioned above, using both styli to obtain simultaneous measurements for diametrically opposed points reduces considerably the total time required for measurement of the cylindrical form and the effects of errors which are temporal in nature (for example thermal effects) are minimised.

As in the example described above with reference to FIGS. 2 and 3, the cylindrical form data $P_i^K(h_y)$ may be obtained by measurement at each height $h_y$ in turn sequentially for each measurement position P & P', that is in order, $P_i(h_1), P_i(h_2), P_i(h_3) \ldots P_i(h_n)$ and then $P_i'(h_1), P_i'(h_2), P_i'(h_3) \ldots P_i'(h_n)$.

In practice the full data required to describe the cylindrical form $P_i^K(h_1)$ can be determined by changing i, y and K in any order.

In the second embodiment illustrated in FIG. 3 it is preferable to obtain both data sets $P_i(h_y)$ and $P_i'(h_y)$ whilst the carriage remains at height $h_y$ to avoid errors in re-positioning the carriage 6 to the height $h_y$ which might arise if both the data sets are not taken at this time.

As will be appreciated, the radius R measured by one of the styli 9a and 9b at a point on the surface at an orientation θ at height h will again be given by:

$$P_\theta(h)=r-\delta r+\delta c \qquad 4)$$

while the radius measured by the other stylus of the same point on the surface of the workpiece will be:

$$P_\theta'(h)=r-\delta r-\delta c \qquad 5)$$

where δr is again the out of roundness of the workpiece at the point being measured and δc is the deviation from straightness in the measurement direction in the axial straight datum B.

The radial polar data obtained from each of the two styli 9a and 9b may thus be combined, as described above with reference to FIGS. 2a to 3d, for each measurement point $P_i(h_y)$ so as to obtain a set of data for the cylindrical form of the workpiece which is independent of any error in the straightness of the axial straight datum in the measurement direction.

As well as permitting assessment of surfaces independent of the axial straight datum (and therefore of any error δc), the apparatus shown in FIGS. 4a and 4b also enables an indication of the actual lack of straightness δc in the axial straight datum at a given height to be determined. Thus, subtracting equations 4) and 5) gives:

$$P_\theta(h)-P_\theta^1(h)=2\delta c \qquad 6)$$

Hence, taking the difference between any two corresponding data points and dividing by 2 gives δc. Assessment of δc can thus be made at a nominated test orientation θ or by a suitable averaging process over a number of values of θ.

In the above explanation, it has been assumed that the rotational axis of the cylindrical surface being measured is precisely positioned upon the spindle axis. It has also been assumed that the stylus or styli are exactly positioned on a diameter (that is on crest). However, in practice, the rotational axis C of the workpiece cylindrical surface may be somewhat offset from the spindle axis A.

Figure 5A:
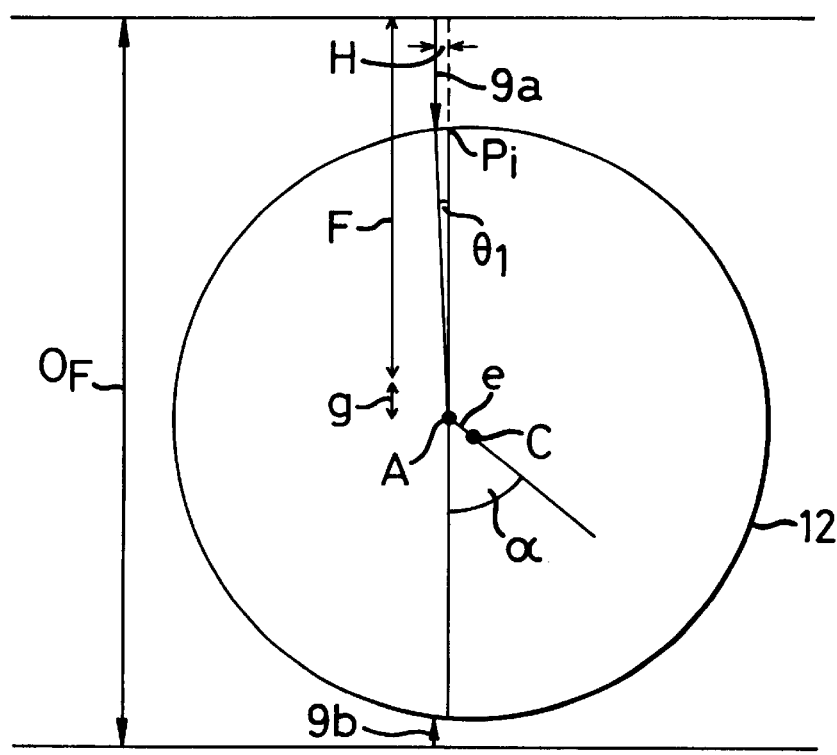
FIGS. 5a and 5b are diagrams for explaining in more detail a method embodying the invention using apparatus such as that shown in FIGS. 4a and 4b.
Figure 5B:
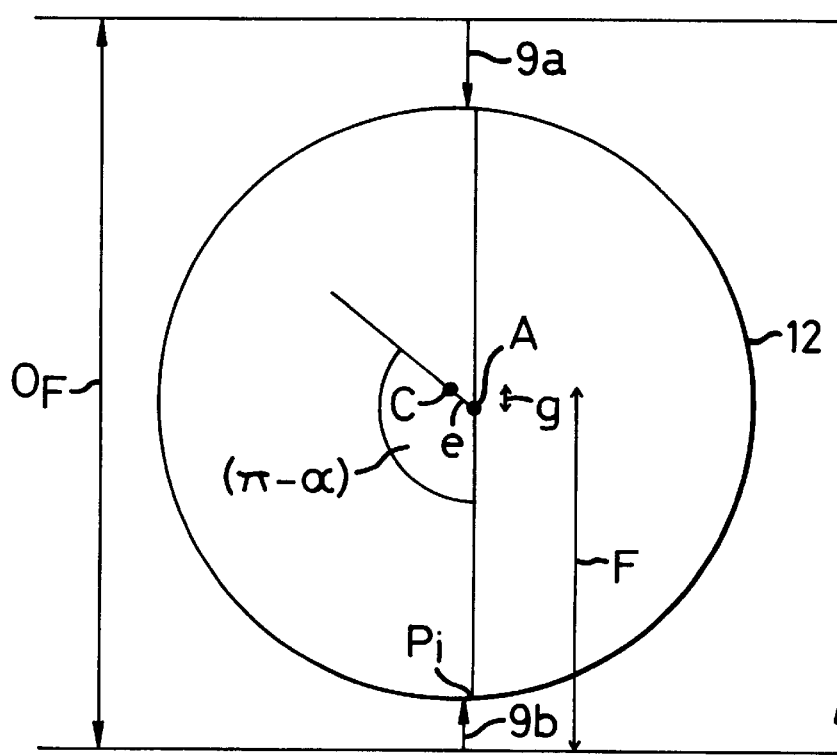

FIGS. 5a and 5b illustrate this diagrammatically. In FIG. 5a, the radius at the point $P_i$ is being measured by one stylus 9a of a pair of styli 9a and 9b. In FIG. 5b, the radius at the point $P_i$ is being measured by the other stylus 9b when the workpiece 12 has rotated through 180°. FIGS. 5a and 5b show the rotational axis C of the workpiece cylindrical surface as being offset from the spindle axis A by a distance e (the eccentricity) at an angle α to the diameter between the styli 9a and 9b.

It is well known in the art that the surface traced out by a point on a circle which is rotated off-axis is approximated by a limicon in polar coordinates. Thus, the radius $R_{P1}$ at point $P_i$ in FIG. 5a is given by:

$$R_{P1}=F+g+e \cos(\alpha) \qquad 7)$$

where 2F is the distance between the null positions of the two gauges or styli 9a and 9b (manually set to the component diameter) and g is the offset of the centre point $O_F$ between the two gauges from the spindle axis A in the direction of the gauge reading. The offset g will therefore include any error δc in the straightness of the axial straight datum in the measurement direction.

When the workpiece has been rotated through 180° to the position shown in FIG. 5b then the equation of the point $P_i$ in polar coordinates is given by:

$$R_{P2}=F+g+e \cos(\alpha+\pi) \qquad 8)$$

As indicated above, however, the styli may be slightly off-crest by a cresting distance H. For the first position of the point $P_i$ on the surface of the workpiece shown in FIG. 5a this is given by:

$$\sin\theta_1 = \frac{H}{R_{P1}(x+\theta_1)} \quad 9)$$

where $\theta_1$ is the angle between the desired measurement position $P_i$ and the actual measurement position (the cresting angle) and $R_{P1}(x+\theta_1)$ represents the measurement at the point on the circumference of the workpiece 12 offset from the point $P_i$ by the cresting angle $\theta_1$.

The above equation can be solved for $\theta$ by using an appropriate mathematical computing package or software program, for example "Maple 5" which is a symbolic mathematics package produced by Maple Software of 450 Phillips Street, Waterloo, Ontario, Canada.

Using the above-mentioned mathematics package to solve for the cresting angle $\theta_1$ as a series in terms of the cresting error distance H gives:

$$\theta_1 = \frac{H}{(F+g+e\cos(\alpha))} + \frac{H^2 e\sin(\alpha)}{(F+g+e\cos(\alpha))^3} + O(H^3) \quad 10)$$

where the series is truncated at terms of the order of $H^3$.

By analogy, the cresting error H at the position 2 shown in FIG. 5b is given by:

$$\sin\theta_2 = \frac{H}{R_{P2}(x+\theta_2)} \quad 11)$$

Using the same mathematics package to solve for $\theta_2$ in terms of a series in H gives:

$$\theta_2 = \frac{H}{(R-g-e\cos(\alpha))} + \frac{H^2 e\sin(\alpha)}{(F-g-e\cos(\alpha))^3} + O(H^3) \quad 12)$$

The signal $S_1$ from the stylus 9a in FIG. 5a with the cresting error given in equation 10) is:

$$S_1 = R_{P1}(x+\theta_1)\cos(\theta_1) \quad 13)$$

The signal from stylus 9b at position 2 in FIG. 5b (that is when the component has been rotated through 180°) with the cresting error given in equation 12) is:

$$S_2 = R_{P2}(x+\pi-\theta_2)\cos(\theta_2) \quad 14)$$

Solving for $S_1$ as a Taylor series in the cresting error H gives:

$$S_1 = (F+g+e\cos(\alpha)) - \frac{He\sin(\alpha)}{(F+g+e\cos(\alpha))} + O(H^2) \quad 15)$$

Similarly, solving for $S_2$ as a Taylor series in terms of the cresting error H gives:

$$S_2 = (F-g+e\cos(\alpha)) + \frac{He\sin(\alpha)}{F-g-e\cos(\alpha)} + O(H^2) \quad 16)$$

Taking the mean of the two signals $S_1$ and $S_2$ and expanding this as a Taylor series in the cresting error H gives:

$$S_{mean} = (F+e\cos(\alpha)) + \quad 17)$$
$$\left(-\frac{1}{2}\left(\frac{e\sin(\alpha)}{F+g+e\cos(\alpha)}\right) + \frac{1}{2}\left(\frac{e\sin(\alpha)}{F-g-e\cos(\alpha)}\right)\right)H + O(H^2)$$

where, as in equations 10) and 12), O indicates terms of the order of the indicated power. Converting the series of equation 17) into a polynomial in the cresting error or distance H gives:

$$PS = \quad 18)$$
$$(F+e\cos(\alpha)) + \left(-\frac{1}{2}\left(\frac{e\sin(\alpha)}{F+g+e\cos(\alpha)}\right) + \frac{1}{2}\left(\frac{e\sin(\alpha)}{F-g-e\cos(\alpha)}\right)\right)H$$

Typically, F=1.25 mm, g=−0.005 mm, e=0.001 mm and H=0.001 mm.

Because F is very much larger than g and e, the terms in sin$\alpha$ in equation 18) will be very similar to one another and will effectively cancel out. Thus, to first order, the measure of the radius obtained by taking the mean of the signals from the stylus 9a in FIG. 5a and the stylus 9b in FIG. 5b is not affected by the cresting error H or the offset g.

In the examples described above, the workpiece is itself rotated. However, other arrangements can be envisaged wherein the measuring arrangement (the stylus or styli) is rotated rather than the workpiece.

Figure 6A:
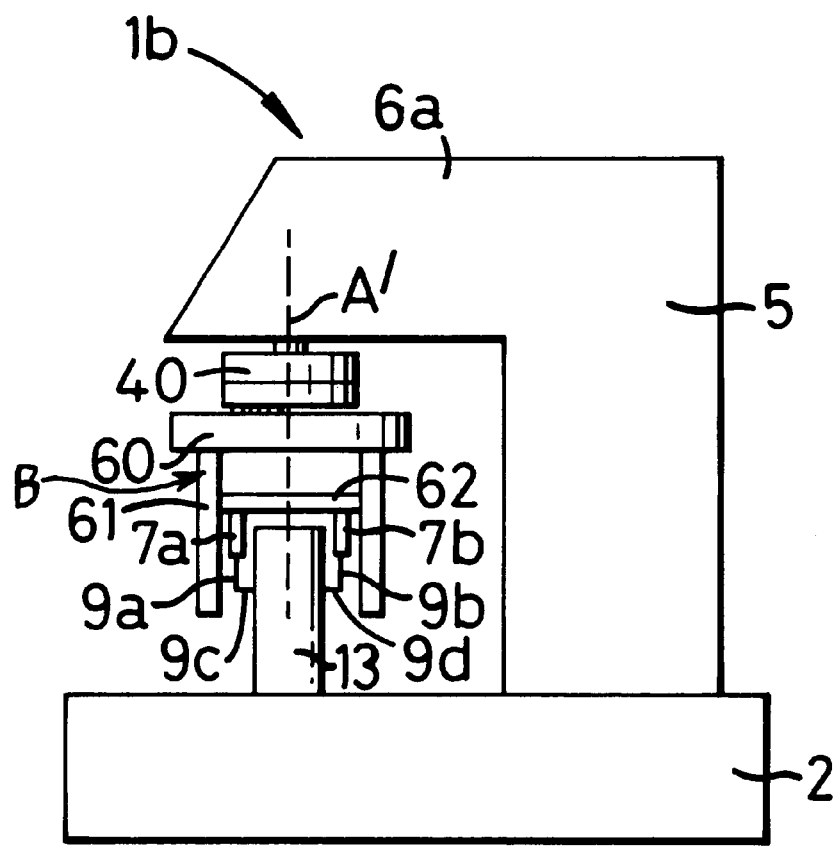
FIG. 6a is a diagrammatic side view of a second example of apparatus suitable for use in a second embodiment of a method in accordance with the present invention.

FIG. 6a illustrates, very schematically, such a type of apparatus 1b suitable for use in a method in accordance with the invention. The apparatus shown in FIG. 6a is, like the apparatus shown in FIGS. 4a and 4b, a twin gauge system. However, in the apparatus shown in FIG. 6a, the turntable 4 is omitted and replaced by a rotatable spindle 40 (which may have any suitable conventional form) mounted to an arm 6a fixed to the support column 5.

The spindle 40 carries a frame 60 having downwardly depending arms 61 to which is slidably mounted a cross-bar 62 carrying respective mounting chambers 63 for the probe arms 7a and 7b. The cross-bar 62 is movable along the arms 61 in a manner similar to the manner in which the carriage 6 is movable along the support column 5 in FIG. 1. In this example, the arms 61 define the axial straight or reference datum B. The position of the cross-bar 62 with respect to the arms 61 may be determined in a manner similar to that used to determine the position of the carriage 6 in FIG. 1.

Figure 6B:
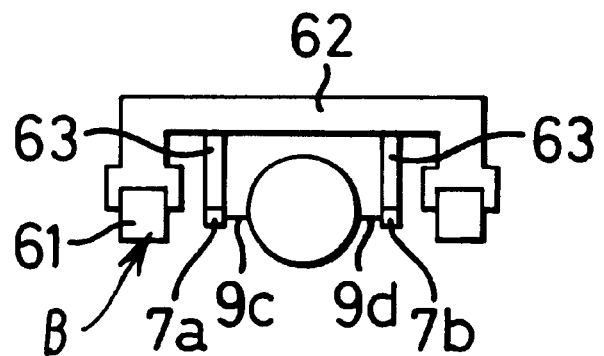

FIG. 6b is a top plan view of part of the apparatus of FIG. 6a showing more clearly the arrangement of the cross-bar 62 and probe arms 7a and 7b. This arrangement enables the styli 9a and 9b to be moved along the height of the workpiece 13 to enable measurements to be taken at different heights.

In the example shown in FIG. 6a, the styli 9a and 9b are configured with inwardly pointing tip portions 9c and 9d for measuring an external surface. However, the styli 9a and 9b shown in FIGS. 6a and 6b could be replaced by the styli shown in FIG. 4 to enable an internal surface to be measured, with appropriate dimensioning of the components of the apparatus to enable the styli to be accommodated within the workpiece being measured.

The apparatus 1b shown in FIG. 6 is used in a similar manner to the apparatus shown in FIGS. 4a and 4b except, in this case, the workpiece 13 is mounted to the work bench 2 so as to be aligned with the spindle axis A' and the spindle 40 rather than the turntable 4 is rotated to obtained the polar data.

In the examples described above, the cylindrical form is determined by making measurements of the radial form at different heights along the workpiece by raising or lowering the stylus or styli. However, another way of measuring cylindrical form is to provide two or more styli or pairs of styli spaced at calibrated fixed distances from one another in a direction defining the axial straight datum.

Figure 7:
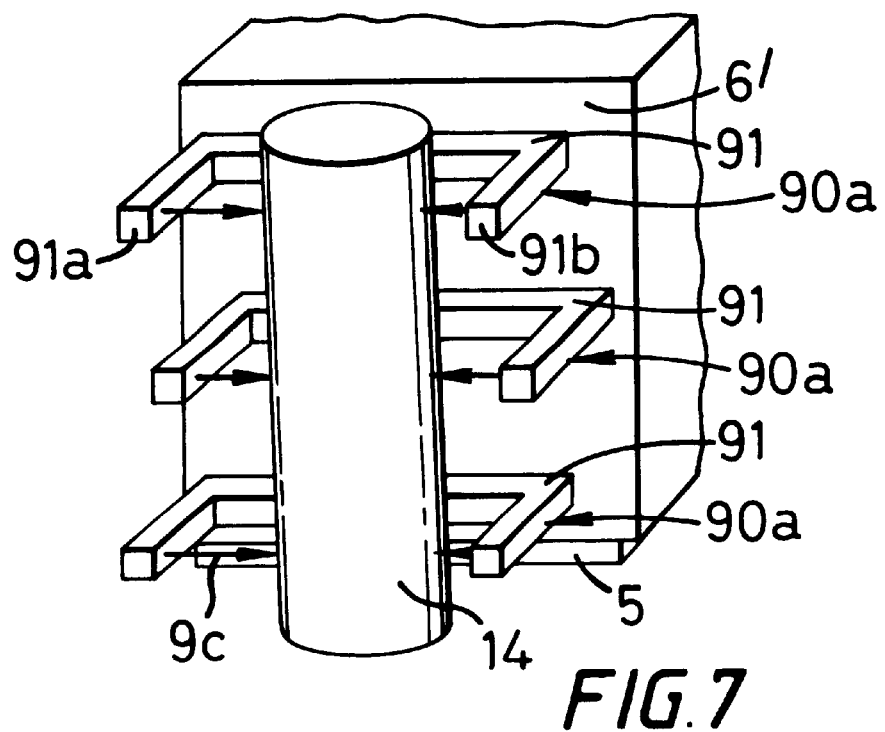
FIG. 7 is a simplified diagrammatic perspective view for illustrating the principles of another embodiment of apparatus suitable for use in a method in accordance with the invention.

FIG. 7 shows schematically part of an apparatus to illustrate the principle of providing a number of twin gauges 90a. In the example shown in FIG. 7, three twin gauges 90 are mounted to a common support 61, causing the sets of twin gauges to be nominally aligned to the component axis which defines the equivalent to the axial straight datum B. Of course, if it is desired only to make measurements at three distinct heights along a workpiece, then the support carrying the twin gauges may be fixed to the support column 5.

As shown very diagrammatically in FIG. 7, each of the twin gauges 90a is in the form of a fixed U-shaped member 91 with the arms 91a and 91b extending perpendicularly of the support or carriage 6'. The free end of each arm 91a and 91b supports a stylus 9c (shown simply by an arrow in FIG. 7) in any suitable conventional manner.

In the arrangement shown in FIG. 7, the arms 91a and 91b of the U-shaped members 91 are fixed in position. It may, however, be possible to mount the arms 91a and 91b on guide rails in a manner similar to that discussed above with reference to FIG. 4a so as to enable the nominal separation of the styli 9c of each twin gauge 90a to be adjusted to allow differently sized work pieces to be measured using the same apparatus.

In operation of the apparatus illustrated by FIG. 7, the workpiece 14 is mounted and centred in conventional manner on the turntable (not shown in FIG. 7) so as to be positioned between the respective styli of the gauges 90a. The styli are then driven in conventional manner to bring them into contact with the surface of the workpiece. Measurements of the radial data sets $P_\theta(h)$ can then be made in the manner described above simultaneously at each of three heights h1, h2 and h3 along the workpiece 14. Because, as described above, deviations from straightness of the axial straight datum are compensated for using a method embodying the invention, it is not necessary for the twin gauges 90a to be calibrated with respect to one another. Of course, each individual gauge should be calibrated in a conventional manner. In addition, in order to ensure compatibility of the twin gauges 9a, calibration of the gauge separation is also required.

The arrangement shown in FIG. 7 may be modified to enable simultaneous measurement of radial form at a number of different heights of an internal surface of a workpiece.

Figure 8:
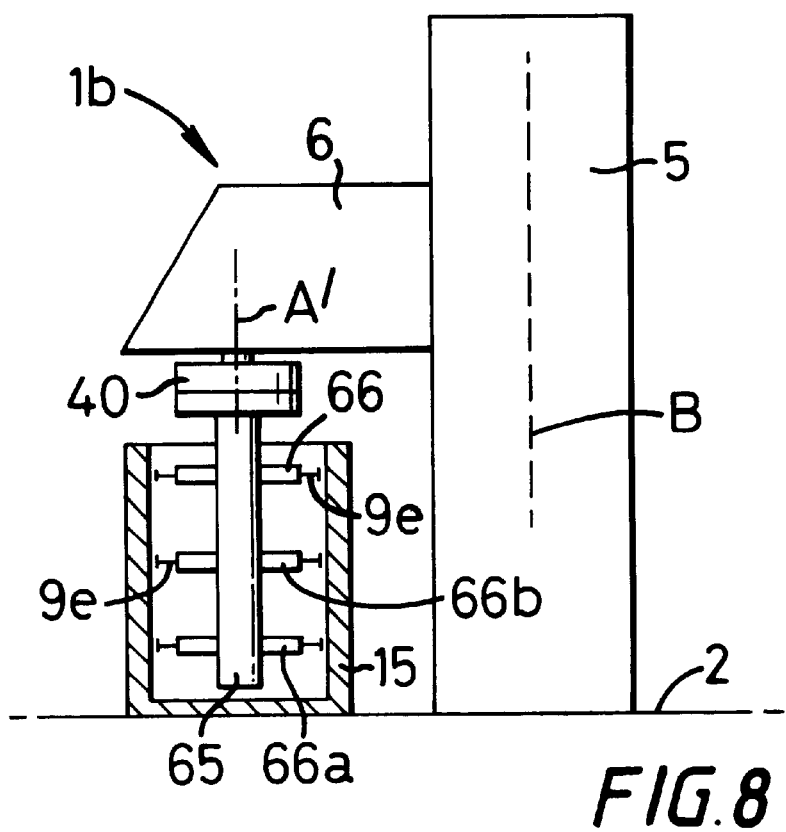
FIG. 8 is a simplified diagrammatic side elevational view of a further embodiment of apparatus suitable for use in a method embodying the invention.

FIG. 8 illustrates very diagrammatically a modified form of the apparatus shown in FIG. 6a. In the example shown in FIG. 8, the frame 60 and depending arms 61 are replaced by a rigid rod 65 to which are fixedly attached pairs of opposed radially extending arms 66a,b,c each of which carries a respective stylus 9e. The apparatus shown in FIG. 8 also differs from that shown in FIG. 6a in that a movable carriage 6 is supported on the support column 5 in a manner similar to that shown in FIG. 1. However any suitable arrangement for nominally aligning the rigid rod 65 with the component axis may be used. For example, the spindle 40 and rigid rod 65 may be carried by a frame which is designed to be portable and to be secured directly to a component to be measured. As in the apparatus of FIG. 7, the reference datum B is defined by the alignment of the twin gauges 9e.

In this example, a workpiece 15 is first mounted on the work bench 2 so as to be aligned with the rotation axis A' of the spindle 40. The carriage 6 is then lowered so as to insert the rigid rod 65 carrying the probe arm 66 and styli 9c into the hollow workpiece. Once the rod 65 has been correctly inserted within the hollow workpiece 15, the probe arms 66c are driven so as to bring the styli 9c into contact with the interior surface of the workpiece 15. Measurements of radial form at each of three different heights are then taken in the manner described above by rotating the spindle 40.

The apparatus shown in FIG. 8 has the advantage that, as in the apparatus shown in FIG. 6, the alignment of the twin gauges 9e (as determined by the rigid rod 65 in this case is not critical because any deviations or errors are compensated for in the manner described above.

Of course, the apparatus shown in FIG. 8 could be modified by providing a turntable 4 on the workbench 2 and fixing the rod 65 against rotation to the carriage 6.

The apparatus shown in FIGS. 7 and 8 may, of course, by modified to provide any desired number of pairs of twin gauges. It may also be possible to mount the twin gauges of FIG. 7 on a movable carriage similar to the carriage 6 shown in FIG. 1 to enable three simultaneous sets of polar data to be obtained at two or more different sets of three heights along the workpiece. Similarly, the carriage 6 shown in FIG. 8 may be moved to enable measurements to be made at more than one set of three heights.

Figure 9:
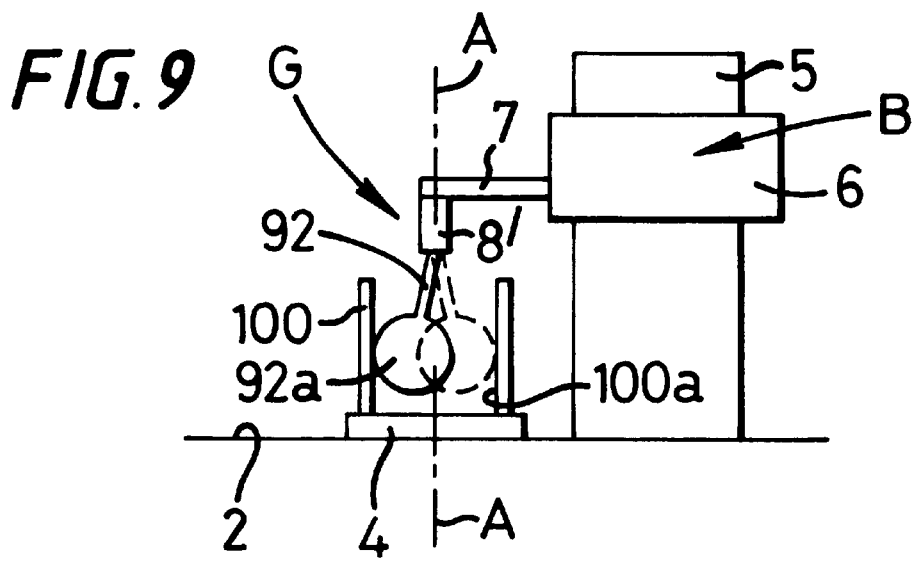
FIG. 9 is a diagrammatic side view similar to FIG. 2a of apparatus similar to that shown in FIG. 1 but having a different gauge for carrying out a third embodiment of a method in accordance with the invention.

FIG. 9 illustrates, by way of a view similar to FIG. 2a, another way of carrying out a method embodying the invention. The apparatus shown in FIG. 9 is similar to that shown in FIGS. 1 and 2a except for the structure of the gauge G carried by the moveable probe arm 7. Only those aspects of the apparatus shown in FIG. 9 which differ from that described above with reference to FIGS. 1 and 2a will now be described.

The stylus of the apparatus shown in FIG. 9 comprises a stylus arm 92 carrying a stylus 92a which may be, for example, in the form of a ruby or sapphire ball. The stylus arm 92 is arranged to be pivotable in a direction extending radially of the rotational axis so as to allow the stylus point 92a to contact opposite ends $P_i$ and $P_{i+\theta}$ of a diameter of an internal surface 100a as shown more clearly in FIG. 10.

In order to measure the cylindricity of the surface 100a, the carriage 6 is given to a desired first measurement height $h_1$ with the probe arm 7 positioned so that the probe arm 8' is aligned with the rotational axis datum A. This may be achieved by using a fixed length probe arm or by driving a moveable probe arm 7 to bring the arm 8' into alignment with the rotational axis datum A.

The stylus arm 92 is then pivoted by biassing means as will be described below to bring it into contact with the point $P_i(h_1)$. The turntable 4 carrying the workpiece 100 is then rotated about the rotational axis A and a set of radius values $P_i(h_1)$ is obtained for each angular orientation i, of the workpiece at the height $h_1$.

The stylus arm 92 is then pivoted using the biassing means to be described below to bring the stylus point 92a into contact with the point $P_{i+\pi}$ diametrically opposed to the point $P_i$ on the internal surface 100a of the workpiece. A further set of radius values $P_{i+\pi}(h_1)$ is then obtained for each angular orientation of the workpiece at the height $h_1$.

Measurements at different heights $h_y$ along the workpiece are made by driving the carriage 6 along the column 5 to new heights $h_y$ and repeating the radius value measurements for $P_i(h_y)$ and $P_{i+\pi}(h_y)$ at each height $h_y$.

Alternatively, the sets of radial values $P_i(h_y)$ may first be obtained at the different heights $h_y$ and then the biassing reversed and the sets of radial values $P_{i+\pi}(h_y)$ obtained for the different heights $h_y$.

The obtained radial or polar data $P_i(h_y)$ and $P_{i+\pi}(h_y)$ are then processed as described above to obtain data representing the cylindricity of the internal surface 100a.

Figure 10:
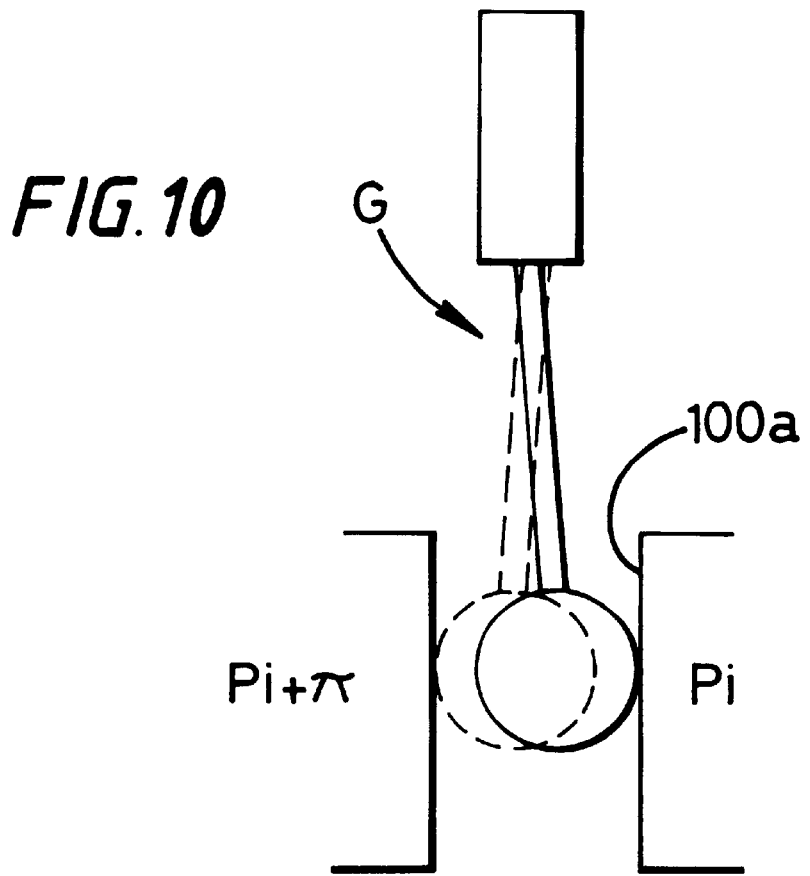
FIG. 10 is an enlarged view of part of the gauge shown in FIG. 9 for explaining the third embodiment of a method in accordance with the invention.
Figure 11:
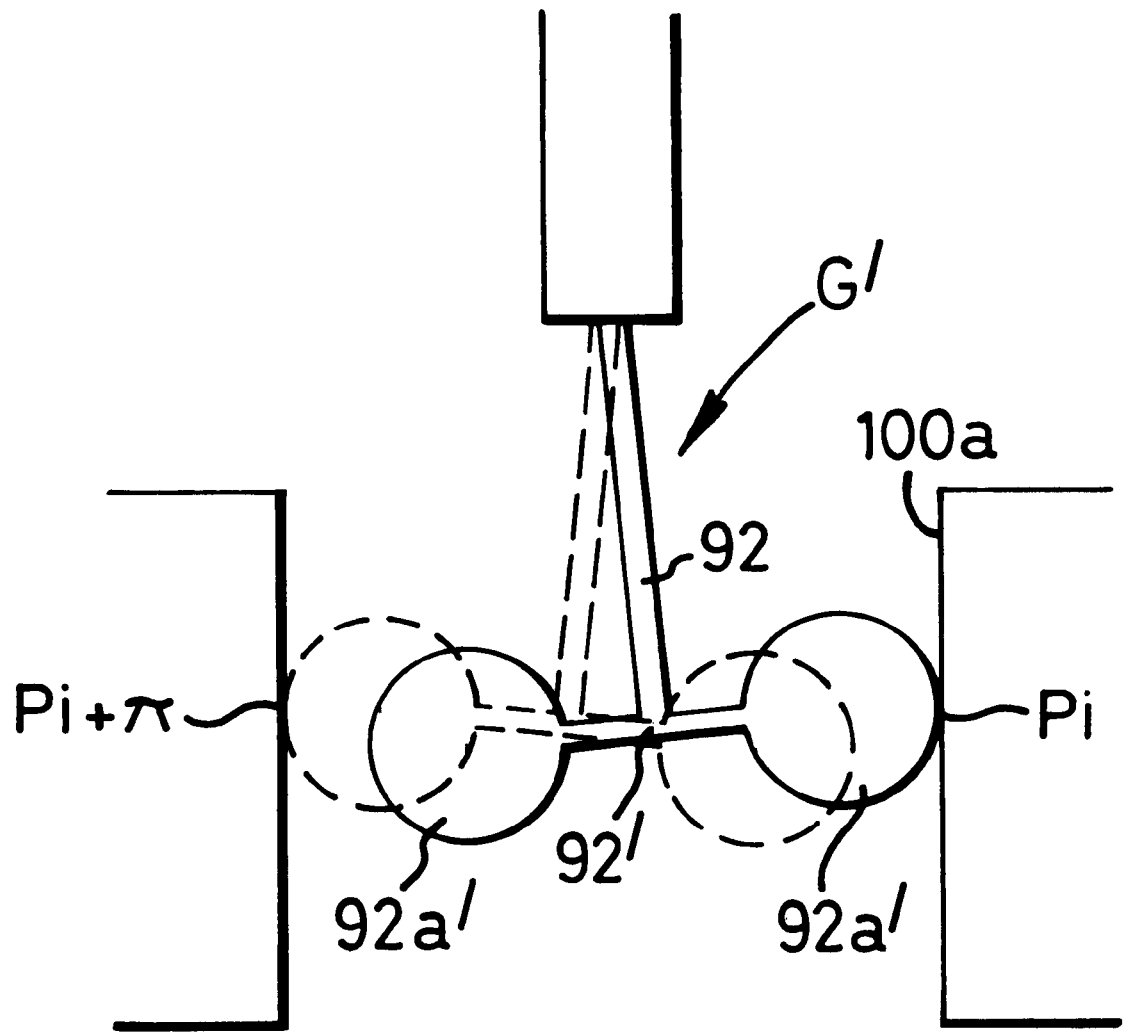
FIG. 11 is a diagrammatic view similar to FIG. 10 for illustrating a modified form of the gauge shown in FIG. 10.

Although FIGS. 9 and 10 are schematic, it will be appreciated that pivoting of the stylus arm 92 causes arcuate motion which produces uncertainties in the height at which contact is made. Such uncertainties can be minimised by using a stylus tip or point 92a with a width which is as close as possible to the bore diameter of the workpiece 100 being measured so that the arcuate motion is kept to a minimum. Such a method is particularly useful for measuring the cylindricity of balls with diameters in the region of 5 to 10 mm.

Where it is desired to measure the cylindricity of larger diameter balls, a modified form of gauge G' may be used as shown in FIG. 11 where the free end of the stylus arm 92 carries a cross-bar 92' having at each end a stylus tip or point 92a'. This modified form of gauge G' can be used to measure the cylindricity of internal balls having diameters significantly larger than the diameter of the stylus tips 92a' while still limiting the arcuate motion of the stylus arm 92. If desired, the length of the cross-piece 92' may be made adjustable by, for example, means of a micrometer adjustment or the like so as to enable the gauge G' to be optimised to fit various different diameters of bore.

Figure 12:
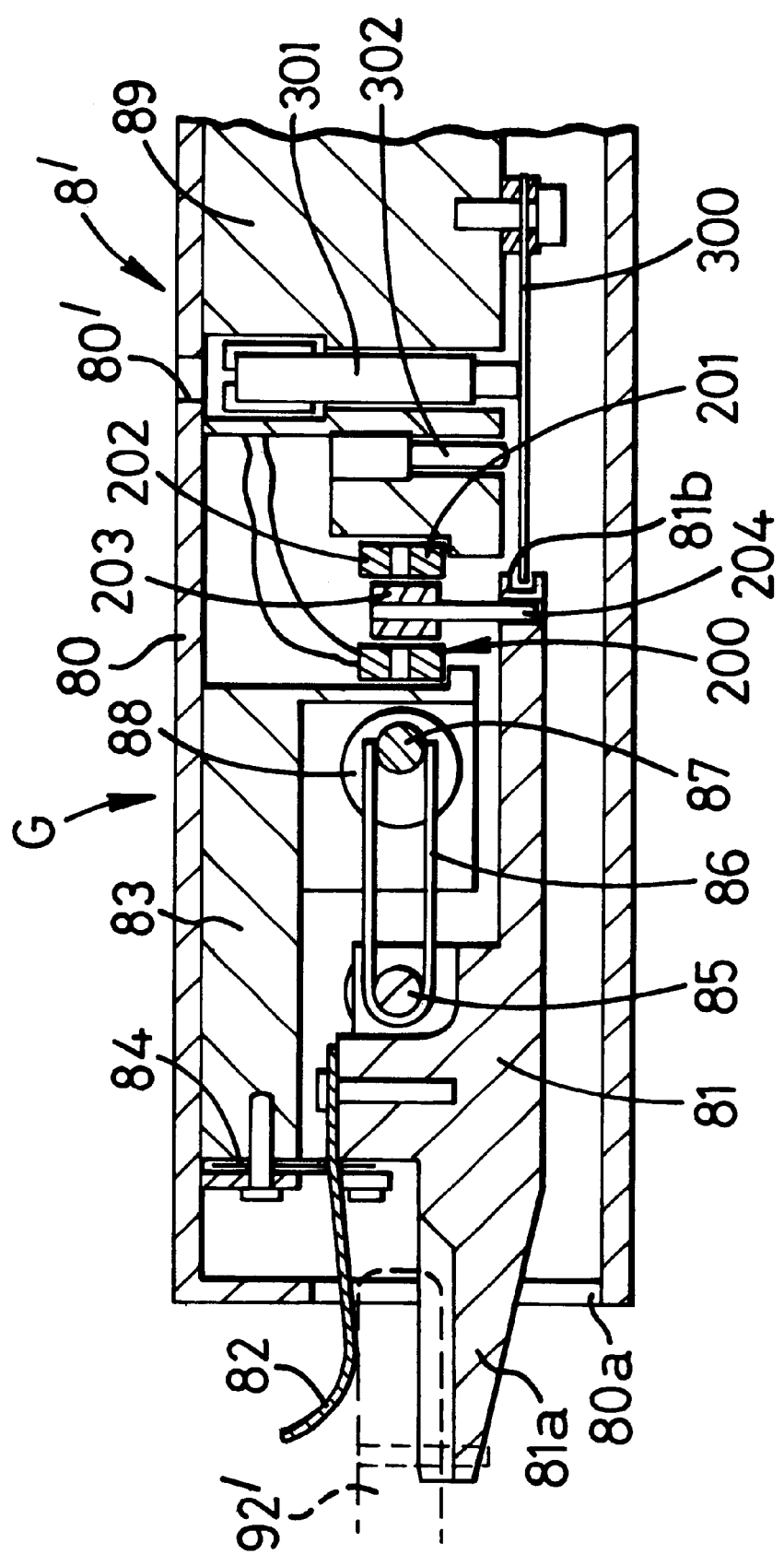
FIG. 12 is a part cross-sectional view of part of the gauge of the apparatus shown in FIGS. 9 to 11.

FIG. 12 is a cross-sectional view of part of a probe arm 8' to show the manner in which the stylus arm 92 may be biassed between the two diametrically opposed positions. For simplicity, electrical connections and other conventional components, for example the rear plug of the probe arm 80' which enables it to be connected to the probe arm 7, are omitted from FIG. 12.

As shown in FIG. 12, the probe arm 8' has a housing 80 having an opening 80a from which an end 81a of a stylus support arm 81 extends. As shown in phantom lines an end 92' of the stylus arm 92 is held in place within a recess of the end 81a of the stylus support arm 81 by means of a spring clip 82.

The stylus support arm 81 is mounted to a mounting block 83 by means of a flexure spring 84 which defines a pivot axis of the stylus support arm 81. A U-shaped spring 86 is mounted to a pin 85 extending transversely of the stylus support arm 81. The free ends of the U-shaped spring 86 captured therebetween a pin 87 mounted eccentrically on a drum 88. Drum 88 is rotatable either manually or by means of a motor (not shown) for example a DC gear motor.

The spring 86 forms the biassing means of the stylus arm 92. The spring 86 is shown in a neutral or central position in FIG. 12 in which the stylus arm 92 is biassed neither to left or right in FIGS. 9 to 11.

When the drum 88 is rotated to a certain angle in an anti-clockwise direction, the pin 87 moves through that angle causing the spring 86 to apply a bias force to the stylus support arm 81 causing the stylus arm 92 to pivot downwardly in FIG. 12. In contrast, when the drum 88 is rotated in a clockwise direction, the movement of the pin 87 applies a biassing force to cause the stylus arm 92 to move upwardly in FIG. 12.

Rotation of the drum 88 may be sensed using any suitable form of shaft encoder, for example a Hall effect arrangement. Different degrees in biassing in both the clockwise and anticlockwise directions may be applied by allowing the drum to be rotated to different degrees. For example, the drum may have two sets of positions in both the clockwise and anti-clockwise directions to give moderate and heavy biassing. The use of a suitable shaft encoder and a motorised drive for the drum 88 enables adjustment of the biassing to be carried out under computer control with the shaft encoder providing signals to the computer processing means to indicate the position of the drum 88.

Pivoting of the stylus support arm 81 is detected in a conventional manner using a linear variable differential transducer (LVDT) 200 comprising a pair of coils 201 and 202 mounted to the mounting block 83 and a ferrite core 203 secured to a shaft 204 carried by the stylus support arm.

The pivotal movement of the stylus support arm 81 is limited by means of a metal plate 300 secured at one end to a mounting block 89 within the housing 80. The free end of the plate 300 is received in a recess 81b provided at the rear end of the stylus support arm. A set screw 301 determines the initial position of the metal plate 300. The set screw may be adjusted by, for example, means of a screwdriver through an aperture 80' in the housing. A limit screw 302 limits the upward movement of the metal plate 300 and thus of the end of the stylus support arm 81.

In the operation of the gauge shown in FIG. 12, when the stylus tip 92a has been located within the internal bore of the workpiece 100 at the desired height by movement of the carriage 6 and adjustment of length of the movable probed arm 7 (if appropriate), the rotatable drum 88 is rotated either manually or by means of an electric motor to move the pin 87 off-centre so as to bias the stylus arm 92 towards one of the two opposed positions so that the stylus arm 92 pivots under the biassing force until the stylus tip 92 contacts the inner surface 100a of the workpiece.

As will be appreciated by those skilled in the art, roundness measuring apparatus such as that being described is designed to measure movements of the order of micrometers whereas the distance moved by the stylus tip 92a under the biassing force before it reaches the workpiece surface 100a will be of the order of millimeters. Thus, although the LVDT will be designed to detect the position of the stylus support arm (and thus of the stylus tip 92a) throughout the possible range of movement under the biassing force, the measurements obtained by the apparatus during the pivotal movement under the influence of the biassing force will be out of the range of the expected measurement. Contact with the surface 100a of the workpiece is determined to be that point at which the measurements resulting from the signal supplied by the LVDT fall within the expected range. It is not necessary to know this position absolutely because it is not the absolute position of the point on the workpiece surface which is being measured but rather the polar variation or out of roundness of the workpiece surface 100a at that particular height.

Although the gauge described above with reference to FIG. 12 is primarily intended for measuring internal bores, such a reverse-biassing gauge may also be used in other circumstances where it is desirable to measure two opposed surfaces. For example, such a reverse-biassed gauge may be used in the apparatus shown in FIGS. 2a to 2d with the stylus being biassed towards the left in FIG. 2a and towards the right in FIG. 2c. Such a reverse-biassing gauge may also be used where relative measurements of opposed surfaces are required, for example to enable a lower surface to be measured from beneath and an upper surface to be measured from above to determine any variations in thickness of an object.

In the embodiments described above, the two sets of polar data at each height are averaged to compensate for variations in the reference datum B. Another method of processing the polar data sets to compensate for errors in the vertical datum B will now be described with reference to FIGS. 13a to 13c. This method may be used in any of the embodiments described above.

FIG. 13a shows at A1 examples of polar data obtained at three heights $h_1$, $h_2$ and $h_3$ during the first measurement, that is with the measurement points $P_i$. FIG. 13b shows at A2 the corresponding polar data obtained for the heights $h_1$, $h_2$ and $h_3$ during the second set of measurements, that is with the measurements taken at an angular separation from the measurements shown in FIG. 13a, generally with the measurements taken at point $P_{i+\pi}$.

In this method, instead of averaging the two sets of data $P_i(h_y)$ and $P_{i+\pi}(h_y)$ for each value of y, each set of polar data $P_i(h_y)$ and $P_{i+\pi}(h_y)$ is fitted to a circle. As described in the book entitled "Lets Talk Roundness" by H Dagnell M.A., there are four different reference circles specified in the British, US and Japanese standards, namely, the least squares circle, the minimum zone reference circles, maximum inscribed reference circle and minimum circumscribed reference circle. In the present case, the least squares circle method is used where the mathematical definition of the circle is that for which the sum of the squares of a sufficient number of equally spaced radial points measured from the circle to the profile has minimum value. This fitting procedure may be carried out using any appropriate conventional least squares fitting algorithms. The least square circle ($C_i(h_1)$, $C_i(h_2)$, and $C_i(h_3)$ obtained are shown at C1 in FIG. 13a.

The same procedure is carried out with the second set of data taken at the orientation $P_{i+\pi}$ to derive the least squares circles $C_{i+\pi}(h_1)$, $C_{i+\pi}(h_2)$ and $C_{i+\pi}(h_3)$ shown in FIG. 13b.

The average of the reference circles $C_1(h_y)$ and $C_{i+\pi}(h_y)$ at each height $h_y$ are obtained to provide the data $\overline{C}$ shown in FIG. 13. The least squares circle $\overline{C}_i(h_y)$ for a height $h_y$ is then subtracted from the average circle $\overline{C}_{(y)}$ for that height and added to the raw polar data $P_i(h_y)$ for that height. The resulting data $P_e(h_y)$ represents the actual shape of the surface 100a at the height $h_y$ corrected for any errors in the vertical axis datum B.

The method described above with reference to FIG. 13 has advantages in that angular phase errors which may be produced if the angular separation of the two measurement positions is not precisely known are significantly reduced because such errors can have only a minor effect on the position or radius of the reference circle. This should avoid false averaging problems which may otherwise occur where the wavelengths of variations of the surface 100a are short.

It will, of course, be appreciated that the correction shown in FIG. 13 can be applied to either the set of data $P_i(h_y)$ or the data $P_{i+\pi}(h_y)$ by subtracting the appropriate set of reference circles $C_i(h_y)$ or $C_{i+\pi}(h_y)$.

A method embodying the present invention may also applied to a modified coordinate measuring machine in which, as described in, for example, GB-A-1137238 or GB-A-2160975 (the contents of which are herein incorporated by reference) measurements are made on an x, y, z rectangular coordinate system.

FIG. 14 illustrates very schematically an example of coordinate measuring machine modified to be used in a method in accordance with the present invention.

As shown in FIG. 14, the coordinate measuring machine comprises a work bench 20 carrying two guide rails 21a and 21b which extend spaced-apart and parallel to one another in a direction perpendicular to the plane of the paper (the x direction). A U-shaped frame 22 is supported so as to be drivable along the guide rails 21a and 21b by any suitable drive means and using any suitable form of bearing arrangement. The cross-bar 22a of the U-shaped frame 22 carries a movable carriage 23 which supports a support member 24. The support member 24 is moveable relative to the carriage 23 in the z direction by any appropriate drive mechanism. Suitable measurement transducers are associated with the x, y and z direction drive mechanisms, for example optical or electromagnetic transducers as mentioned above, to enable to precise location in x, y and z coordinates of a probe carried by the support 24 to be determined.

The components of the coordinate measuring machine described above are conventional.

As shown in FIG. 14 the work bench 20 is provided with a rotatable support or turntable 4b similar to that shown in FIG. 1. In this case, the z axis support 24 carries a fixed probe arm 7a carrying a single stylus 9a. The coordinate measuring machine shown in FIG. 14 may be used in the manner described above with reference to FIGS. 2a to 2d and 3a and 3d by causing the carriage 23 to move along the cross-bar 22a to enable a first measurement of the radius at a point P on the circumference at height h of the workpiece 15 to be measured with the carriage 23 at a first position y1 and a second measurement of the radius at the point P to be measured when the turntable has been rotated through 180° and the carriage 23 moved to a position y2 shown in phantom lines in FIG. 14. The radial and cylindrical form can then be determined as described above with reference to FIGS. 2a to 2d and 3a to 3d. As another possibility, the apparatus shown in FIG. 14 may be modified by replacing the single stylus with one, or possibly more, calliper gauges to enable the methods described above with reference to FIG. 4 to be performed.

In each of the examples described above, the radial and cylindrical form data are generally calculated by a suitable programmed computer processing system which receives input signals from the transducers of the apparatus. FIG. 15 shows a simplified block diagram of a suitable processing system comprising a central processing unit 50 associated with a memory comprising ROM and RAM for storing operational programs and data, respectively.

During the measurement of the cylindrical form of a workpiece, data from the transducers is logged by the computer processing system and then used to determine the radial and cylindrical form of the workpiece in the manner described above. FIG. 15 shows the central processing unit 50 as being coupled to three transducers T1, T2 and T3 providing signals representing the rotation of the turntable, the height of the carriage along the column support 5 and the position of the probe arm 7. Of course, the number of transducers will depend upon the particular apparatus, as described above. Thus, where a motorised reversible-biassed gauge such as that shown in FIG. 12 is used, a further transducer T4 in the form of a suitable shaft encoder will be provided to supply signals indicative of the biassing of the gauge. The central processing unit 50 will also normally be connected, via appropriate conventional control interface circuits (not shown), to motors M1, M2 and M3 for controlling the rotation of the turntable, the height of the carriage and the position of the extending arm 7 respectively. Again, where a motorised reversible bias gauge is used, the central processing unit 50 will normally be connected, via appropriate conventional control interface circuits (not shown) to control operation of a motor M4 of the reversible-bias gauge.

The processing system may be provided with an input device 52 in the form of a keyboard which may be associated with a mouse 52a or other appropriate pointing device to enable a user to input information concerning, for example, recent calibration of the apparatus or machine, or instructions regarding the particular method to be used. In addition, a display unit such as a cathode ray tube 53 may be associated with the control processing unit 50 to enable, using appropriate conventional software, visual displays of the measurements made with the apparatus to be provided. As an alternative or addition to the visual display unit, an output device such as a printer or plotter may be provided to enable a hard copy to be provided of the measured data in the form of, for example, tabulated radial data and/or a graphical representation of the measured data.

Although in the examples described above, two measurements of the polar data at a single position at a given height on a workpiece are made, if desired three or more such measurements may be made by, for example, providing three or more measurements stylised equally angularly spaced around the periphery of the workpiece.

Also, although in the examples described above a set of polar data is first obtained at a given height, it may be possible or desirable in some circumstances to move the stylus or stylii axially of the workpiece or component to obtain data at different heights h and then to effect relative rotation between the workpiece and the sensing means.

If desired, where a twin gauge is provided, a first measurement of diameter may be made by determining the relative separation of the two gauges. This first measurement is independent of any errors in the axial straight datum B and may be compared with a second measurement of diameter obtained by combining the radii measured at the two opposed points by the stylii to give an indication of the actual deviation or error in the axial straight datum at that diameter.

Although the above examples describe ways of determining the cylindrical form of a workpiece surface, the present invention may be used to determine the form of any suitable surface, for example any surface which is nominally symmetric about an axis of rotation. For example, the present invention may be used to determine the form of a surface of constant polygonal, ellipsoidal or irregular cross-section or a tapered surface such as a frustoconical or conical surface or a surface of non-constant cross-section.

The present invention may also be used to determine the form of any surface that is produced by a machine tool such as a lathe or grinder. For example, the apparatus may be provided as an attachment to a lathe or grinder with for example a twin gauge pair being attached to the tool post and the spindle of the lathe or grinder being used to effect rotation to obtain data while the workpiece or component is still in the chuck or jaw of the machine tool. Such an arrangement may allow measurements of the form of a surface to be made at an intermediate stage in the working of the component by the machine tool to check that the machining is proceeding correctly.

Although specific examples of the present invention have been described above, various modifications and alternatives will be apparent to those skilled in the art.

What is claimed is:

1. A method of determining information relating to the form of a surface of an object such as a workpiece, which method comprises sensing the surface using sensing means displaceable relative to a reference datum so as to follow the surface, effecting relative rotation about a rotation axis between the surface and the sensing means and using measurements made by the sensing means as the sensing means follows the surface during the relative rotation to determine information relating to the form of the surface, which method further comprises causing the sensing means to make a measurement at each of at least two positions equiangularly spaced apart around the axis of rotation so that the direction relative to the reference datum from which the sensing means senses the surface differs from each of the at least two positions and combining the measurements to compensate for error or deviation in the reference datum.

2. A method of determining information relating to the form of a surface of an object such as a workpiece, which method comprises sensing the surface using sensing means displaceable relative to a reference datum so as to follow the surface, effecting relative rotation about a rotation axis between the surface and the sensing means and using measurements made by the sensing means as the sensing means follows the surface during the relative rotation to determine information relating to the form of the surface which method further comprises causing the sensing means to make a measurement of the displacement of a location on the surface from the reference datum when that location is at each of at least two positions equiangularly spaced apart around the axis of rotation and combining the measurements to compensate for error or deviation in the reference datum.

3. A method according to claim 2, which comprises determining the mean of the at least two measurements to obtain a value for the radius at that location.

4. A method of determining the form of a surface which is nominally symmetric about an axis, which method comprises using a method in accordance with claim 1, 2 or 3 at a number of different distances along the said axis of the surface to determine the form of the surface.

5. A method according to claim 1, 2 or 3, which comprises using two measurements made at positions spaced apart by 180° to compensate for deviation or error in the reference datum.

6. A method of determining the form of a surface which is nominally symmetric about an axis, which method comprises sensing the surface using sensing means displaceable relative to a reference datum so as to follow the surface, effecting relative rotation of the surface and the sensing means and using the sensing means to make measurements at a number of different measurement distances or heights along the said axis of the surface to determine the form of the surface, which further comprises, for each measurement distance along the said axis, using the sensing means to obtain a first measurement of the displacement from the reference datum of a location on the surface, effecting relative rotation through 810° between the surface and the sensing means and then using the sensing means to obtain a second measurement of the displacement from the reference datum of the same location on the surface and using the mean of the first and second measurements to provide data representing that location.

7. A method according to claim 4, which comprises determining a deviation or error in the reference datum from the difference between the two measurements.

8. A method according to claim 1, which comprises using a sensing means having two opposed sensing elements for sensing simultaneously two opposed locations on the surface.

9. A method according to claim 8, which comprises using the sensing means to make a first measurement of the distance between the two opposed locations by determining the relative separation of the two sensing elements, determining the displacement of each sensing element from the reference datum, combining the two displacements to provide a second measurement of the distance between the two opposed locations, and comparing the first and second distance measurements to determine a deviation or error in the reference datum.

10. A method according to claim 1, which comprises making measurements at two opposed locations using a sensing means having a single sensing element biassable toward each of the two opposed positions and reversing the biassing between the two sets of measurements.

11. A method according to claim 1, which comprises fitting measurements made at each of the at least two positions to a respective circle and subtracting one of the circles from the average of the circles for the at least two positions to determine a deviation or error in the reference datum.

12. A method according to claim 1, which comprises compensating for error or deviation in the reference datum by adding to the measurements made at one of the at least two positions the difference between a circle fitted to the measurements at that position and the average of circles fitted to the measurements made at each of the at least two positions.

13. A method according to claim 1, which comprises using the sensing means to make at least two measurements at different degrees of relative rotation between the surface and the sensing means of each of a set of locations distributed around the rotation axis.

14. A method according to claim 1, which comprises providing a number of sensing means spaced apart along the reference datum for enabling measurements to be made simultaneously at locations spaced apart in the rotation axis direction.

15. A method according to claim 1, which comprises effecting relative rotation of the surface and the sensing means by mounting the surface on a rotatable support and rotating the support.

16. A method according to claim 1, which comprises effecting relative rotation of the surface and the sensing means by rotatably mounting the sensing means to a support and rotating the sensing means.

17. Apparatus for determining information relating to the form of a surface of an object such as a workpiece, comprising: sensing means displaceable relative to a reference datum so as to follow the surface; means for effecting relative rotation between the surface and the sensing means; means for determining from measurements made by the sensing means as the sensing means follows the surface during the relative rotation information relating to the form of the surface; and processing means for combining measurements made by the sensing means at each of at least two positions equiangularly spaced apart around the axis of rotation so that the direction relative to the reference datum from which the sensing means senses that location differs for each of the at least two positions to compensate for error or deviation in the reference datum.

18. Apparatus for determining information relating to the form of a surface of an object such as a workpiece, comprising: sensing means displaceable relative to a reference datum so as to follow the surface; means for effecting relative rotation between the surface and the sensing means; means for determining from measurements made by the sensing means as the sensing means follows the surface during the relative rotation information relating to the form of the surface; and processing means for combining measurements made by the sensing means of the displacement of a location on the surface from the reference datum when that location is at each of at least two positions equiangularly spaced apart around the axis of rotation to compensate for error or deviation in the reference datum.

19. Apparatus according to claim 18, wherein the processing means are adapted to determine the mean of the two measurements to obtain a measurement for that location.

20. Apparatus according to claim 17, 18 or 19, further comprising means for using the sensing means to make measurements at a number of different distances along the axis of the surface for determining the form of a surface which is nominally symmetric about an axis.

21. Apparatus according to claim 17, 18 or 19, wherein the processing means are adapted to use two measurements made at positions spaced apart by 180° to compensate for any deviation or error in the reference datum.

22. Apparatus according to claim 20, wherein the processing means are adapted to determine a deviation or error in the reference datum from the difference between the two measurements.

23. Apparatus for determining the form of a surface which is nominally symmetric about an axis, comprising: sensing means displaceable relative to a reference datum so as to follow the surface; means for effecting relative rotation of the surface and the sensing means; means for using the sensing means to make measurements at a number of different measurement distances or heights along the axis of the surface to determining the form of the surface; control means for, for each measurement distance along the axis of the surface, using the sensing means to obtain a first measurement of the displacement from the reference datum of a location on the surface, causing relative rotation through 180° between the surface and the sensing means then using the sensing means to obtain a second measurement of the displacement from the reference datum of the same location on the surface; and processing means for determining the mean of the first and second measurements to provide data representing that location.

24. Apparatus according to claim 17, wherein the sensing means comprises two opposed sensing elements for sensing simultaneously respective opposed location on the surface.

25. Apparatus according to claim 24, wherein the processing means comprises means for making a first measurement of the distance between the two opposed locations by determining the relative separation of the two sensing elements, means for determining the displacement of each sensing element from the reference datum and combining the two displacements to provide a second measurement of the distance between the first and second locations, and means for comparing the first and second measurements of the distance between the first and second localtions to determine any deviation or error in the reference datum.

26. Apparatus according to claim 17, wherein the sensing means is arranged to make measurements at two opposed locations and comprises a single sensing element bistable towards each of the two opposed positions and means for reversing the biassing between the two sets of measurements.

27. Apparatus according to claim 17, wherein the processing means is arranged to fit measurements made at each of the at least two positions to a respective circle and to subtract one of the circles from the average of the circles for the at least two positions to determine a deviation or error in the reference datum.

28. Apparatus according to claim 17, wherein the processing means is arranged to compensate for error or deviation in the reference datum by adding to the measurements made at one of the at least two positions the difference between a circle fitted to those measurements and the average of circles fitted to the measurements made at each of the at least two positions.

29. Apparatus according to claim 17, wherein the processing means is adapted to use measurements made by the sensing means at least two positions equiangularly spaced apart around the axis of rotation of each of a set of locations distributed around the rotation axis of the surface to compensate for a respective deviation from straightness in the reference datum.

30. Apparatus according to claim 17, wherein a number of sensing means are provided spaced apart along the reference datum for enabling measurements to be made simultaneously at locations spaced apart in the direction of the rotation axis.

31. Apparatus according to claim 17, wherein the means for effecting relative rotation of the surface and the sensing means comprises a rotatable support for the object.

32. Apparatus according to claim 17, wherein the means for effecting relative rotation of the surface and the sensing means comprises a rotatable mounting for the sensing means.

33. A method according to claim 6, which comprises determining a deviation or error in the reference datum from the difference between the two measurements.

34. A method according to claim 6, which comprises using a sensing means having two opposed sensing elements for sensing simultaneously two opposed locations on the surface.

35. A method according to claim 34, which comprises using the sensing means to make a first measurement of the distance between the two opposed locations by determining the relative separation of the two sensing elements, determining the displacement of each sensing element from the reference datum, combining the two displacements to provide a second measurement of the distance between the two opposed locations, and comparing the first and second distance measurements to determine a deviation or error in the reference datum.

36. A method according to claim 6, which comprises making measurements at two opposed locations using a sensing means having a single sensing element biassable toward each of the two opposed positions and reversing the biassing between the two sets of measurements.

37. A method according to claim 6, which comprises fitting measurements made at each of the at least two positions to a respective circle and subtracting one of the circles from the average of the circles for the at least two positions to determine a deviation or error in the reference datum.

38. A method according to claim 6, which comprises compensating for error or deviation in the reference datum by adding to the measurements made at one of the at least two positions the difference between a circle fitted to the measurements at that position and the average of circles fitted to the measurements made at each of the at least two positions.

39. A method according to claim 6, which comprises effecting relative rotation of the surface and the sensing means by mounting the surface on a rotatable support and rotating the support.

40. Apparatus according to claim 20, wherein the processing means are adapted to use two measurements made at positions spaced apart by 180° to compensate for any deviation or error in the reference datum.

41. Apparatus according to claim 40, wherein the processing means are adapted to determine a deviation or error in the reference datum from the difference between the two measurements.

42. Apparatus according to claim 23, wherein the sensing means comprises two opposed sensing elements for sensing simultaneously respective opposed locations on the surface.

43. Apparatus according to claim 24, wherein the processing means comprises means for making a first measurement of the distance between the two opposed locations by determining the relative separation of the two sensing elements, means for determining the displacement of each sensing element from the reference datum and combining the two displacements to provide a second measurement of the distance between the first and second locations, and means for comparing the first and second measurements of the distance between the first and second locations to determine any deviation or error in the reference datum.

44. Apparatus according to claim 23, wherein the sensing means is arranged to make measurements at two opposed locations and comprises a single sensing element biassable towards each of the two opposed positions and means for reversing the biassing between the two sets of measurements.

45. Apparatus according to claim 23, wherein the processing means is arranged to fit measurements made at each of the at least two positions to a respective circle an to subtract one of the circles from the average of the circles for the at least two positions to determine a deviation or error in the reference datum.

46. Apparatus according to claim 23, wherein the processing means is adapted to use measurements made by the sensing means at least two positions equiangularly spaced apart around the axis of rotation of each of a set of locations distributed around the rotation axis of the surface to compensate for a respective deviation from straightness in the reference datum.

47. Apparatus according to claim 23, wherein a number of sensing means are provided spaced apart along the reference datum for enabling measurements to be made simultaneously at locations spaced apart in the direction of the rotation axis.

48. Apparatus according to claim 23, wherein the means for effecting relative rotation of the surface and the sensing means comprises a rotatable support for the object.

49. Apparatus according to claim 23, wherein the means for effecting relative rotation of the surface and the sensing means comprises a rotatable mounting for the sensing means.

50. Apparatus according to claim 17 or 23, further comprising biassing means for biassing the sensing means in a given direction and means for adjusting the direction of the biassing of the sensing means.

51. Apparatus according to claim 50, wherein the sensing device comprises a pivotally mounted arm, the biassing means comprises spring biassing means coupled between the arm and a support and the adjustment means comprises a motor for adjusting the position of the support.

52. Apparatus according to claim 51, wherein the support is eccentrically mounted on a rotatable drum and the motor is adapted to rotate the drum about its axis.

53. Apparatus for determining information relating to the form of a surface of an object such as a workpiece, the apparatus comprising:
   a body;
   an arm pivotably mounted to the body;
   a sensor carried by the arm;
   means for effecting relative rotation between the sensor and the surface to cause the arm to pivot as the sensor follows the surface;
   a transducer or providing a signal related to pivotable movement of the arm;
   a drum rotatably mounted to the body;
   a support eccentrically mounted on the drum;
   a motor for rotating the drum; and
   a biassing spring coupled between the support and the arm, whereby rotation of the drum by the motor adjusts the biassing of the arm by the biasing spring.

54. Apparatus for determining the form of the surface which is nominally symmetric about an axis, comprising:

a body;

an arm pivotably mounted to the body;

a sensor carried by the arm;

means for effecting relative rotation between the sensor and the surface to cause the arm to pivot as the sensor follows the surface;

a transducer for providing a signal related to pivotable movement of the arm;

means for determining from the signal provided by the transducer information relating the form of the surface;

a drum rotatably mounted to the body;

a support eccentrically mounted on the drum;

a motor for rotating the drum;

a biassing spring coupled between the support and the arm, whereby rotation of the drum changes the biassing on the arm from a first biassing condition to a second biassing condition; and processing means for combining measurements made with the arm in the first biassing condition and the arm in the second biassing condition.

* * * * *

UNITED STATES PATENT AND TRADEMARK OFFICE
CERTIFICATE OF CORRECTION

| | |
|---|---|
| PATENT NO. | : 6,327,788 B1 |
| DATED | : December 11, 2001 |
| INVENTOR(S) | : Peter Seddon, Michael Mills, Paul James Scott, Roy George White and Derek Roger Whittle |

It is certified that error appears in the above-identified patent and that said Letters Patent is hereby corrected as shown below:

Title page,
Item [75], Inventors, "Leicestershire" should read -- Loughborough --.

Item [57], ABSTRACT,
Line 9, "represented" should read -- repeated --.

Column 3,
Line 11, after "view" insert -- of --.

Column 4,
Line 65, "height" should read -- heights --.

Column 7,
Line 43, move "$P_i(h_y)$" before "can"

Column 14,
Line 21, "probed" should read -- probe --.

Column 15,
Line 30, "$C(_y)$" should read -- $C(h_y)$ --.
Line 48, before "applied" insert -- be --.

Column 18,
Line 8, after "surface" insert -- , --.
Line 40, "810°" should read -- 180° --.

Column 20,
Line 15, "determining" should read -- determine --.
Line 16, delete "for,"
Line 38, "localtions" should read -- locations --.
Line 42, "bistable" should read -- biassable --.

UNITED STATES PATENT AND TRADEMARK OFFICE
CERTIFICATE OF CORRECTION

PATENT NO. : 6,327,788 B1
DATED : December 11, 2001
INVENTOR(S) : Peter Seddon, Michael Mills, Paul James Scott, Roy George White and Derek Roger Whittle It is certified that error appears in the above-identified patent and that said Letters Patent is hereby corrected as shown below:

Column 22,
Line 13, "an" should read -- and --.
Line 58, "or" should read -- for --.

Signed and Sealed this

Thirteenth Day of August, 2002

Attest:

JAMES E. ROGAN
Attesting Officer
Director of the United States Patent and Trademark Office